INVENTOR:
LAURENCE H. SMITH
ATTORNEYS

Aug. 11, 1964
L. H. SMITH
3,144,121
PEAR FEEDER
Filed July 2, 1962
16 Sheets-Sheet 2
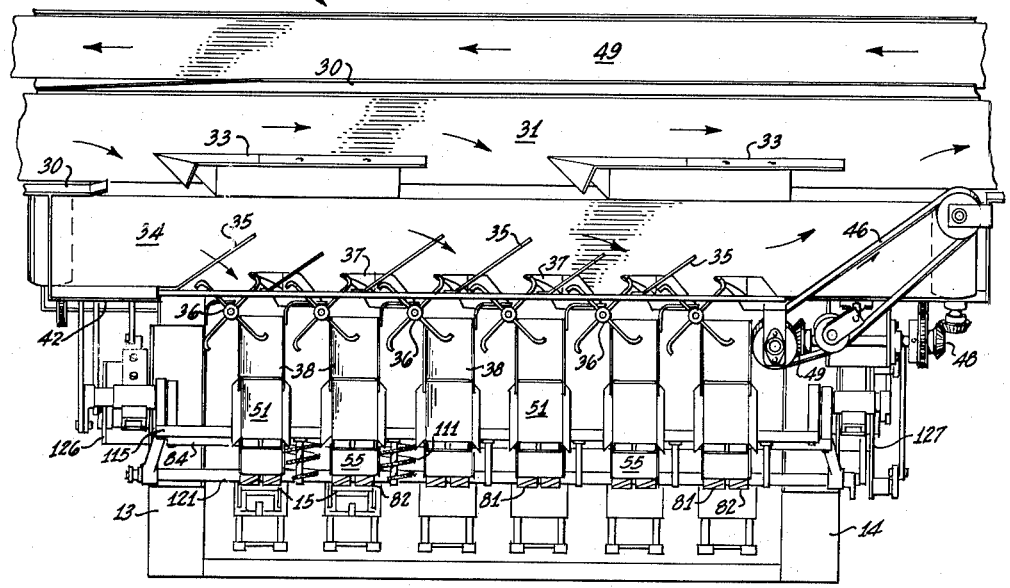
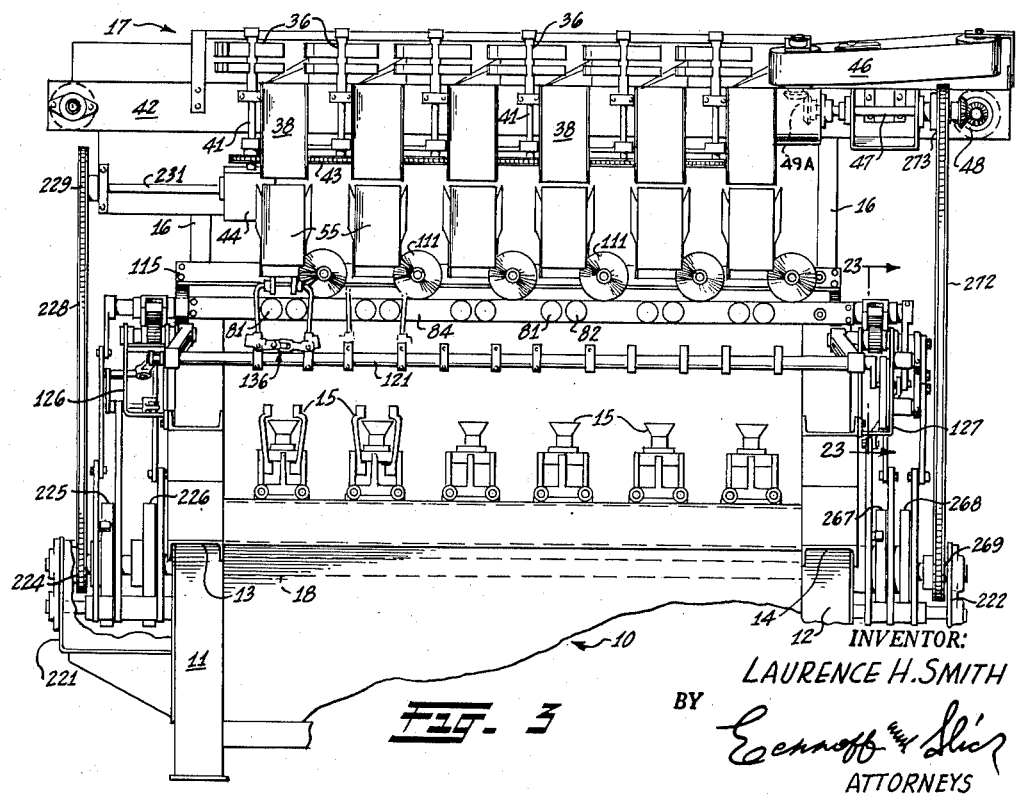
INVENTOR:
LAURENCE H. SMITH
BY
ATTORNEYS

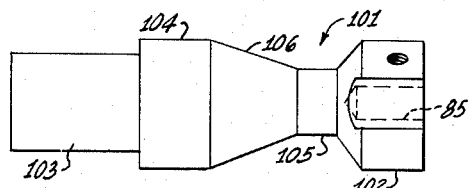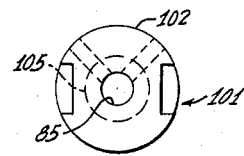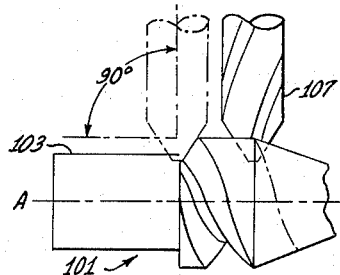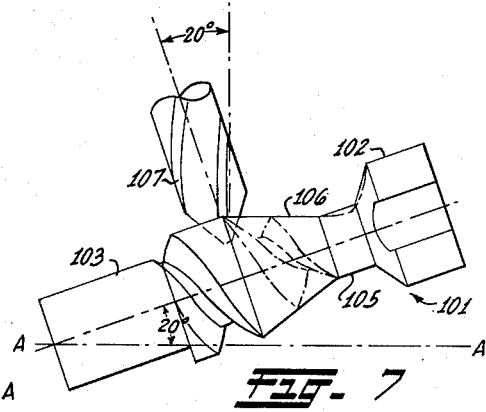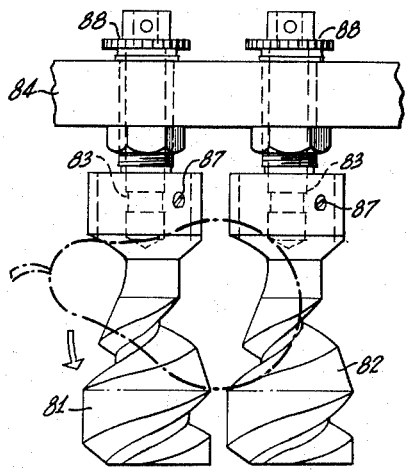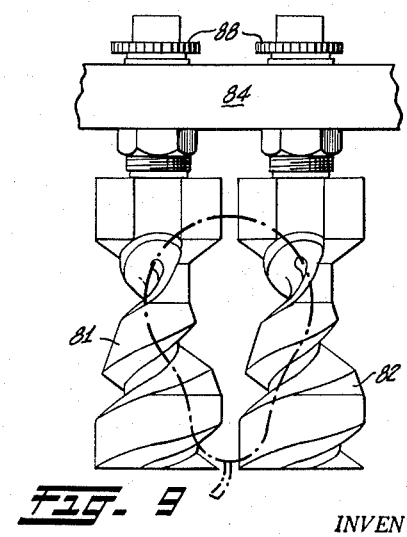

Aug. 11, 1964   L. H. SMITH   3,144,121
PEAR FEEDER
Filed July 2, 1962   16 Sheets-Sheet 4
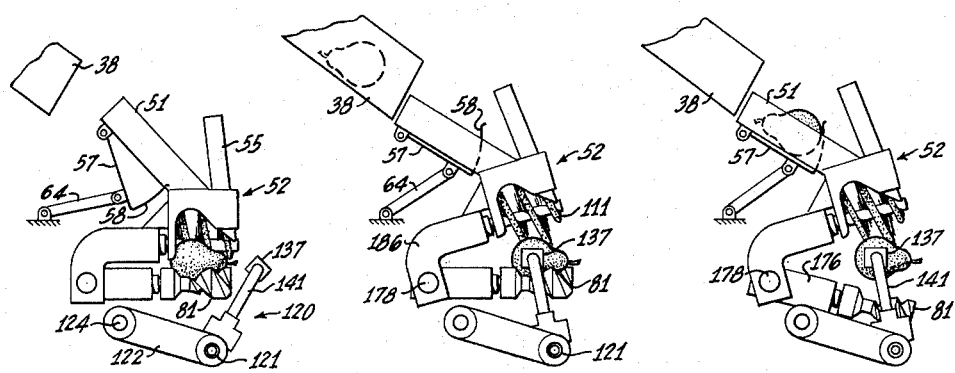
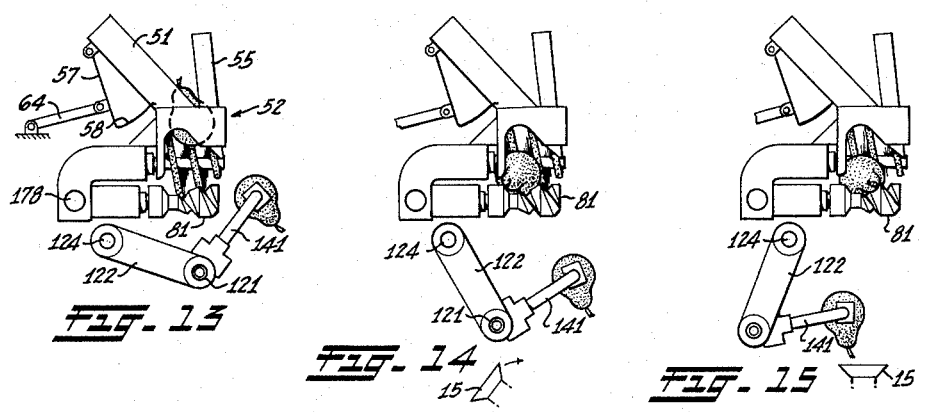
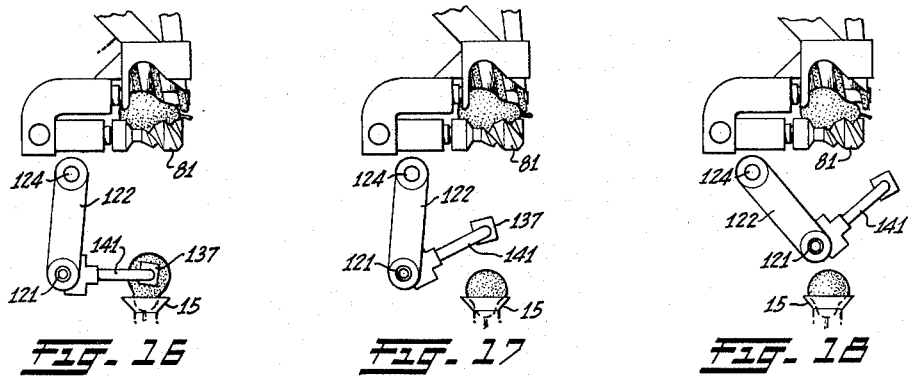
INVENTOR:
LAURENCE H. SMITH
BY
ATTORNEYS Aug. 11, 1964 L. H. SMITH 3,144,121
PEAR FEEDER
Filed July 2, 1962 16 Sheets-Sheet 5

INVENTOR:
LAURENCE H. SMITH
BY
*Eckhoff & Slick*
ATTORNEYS

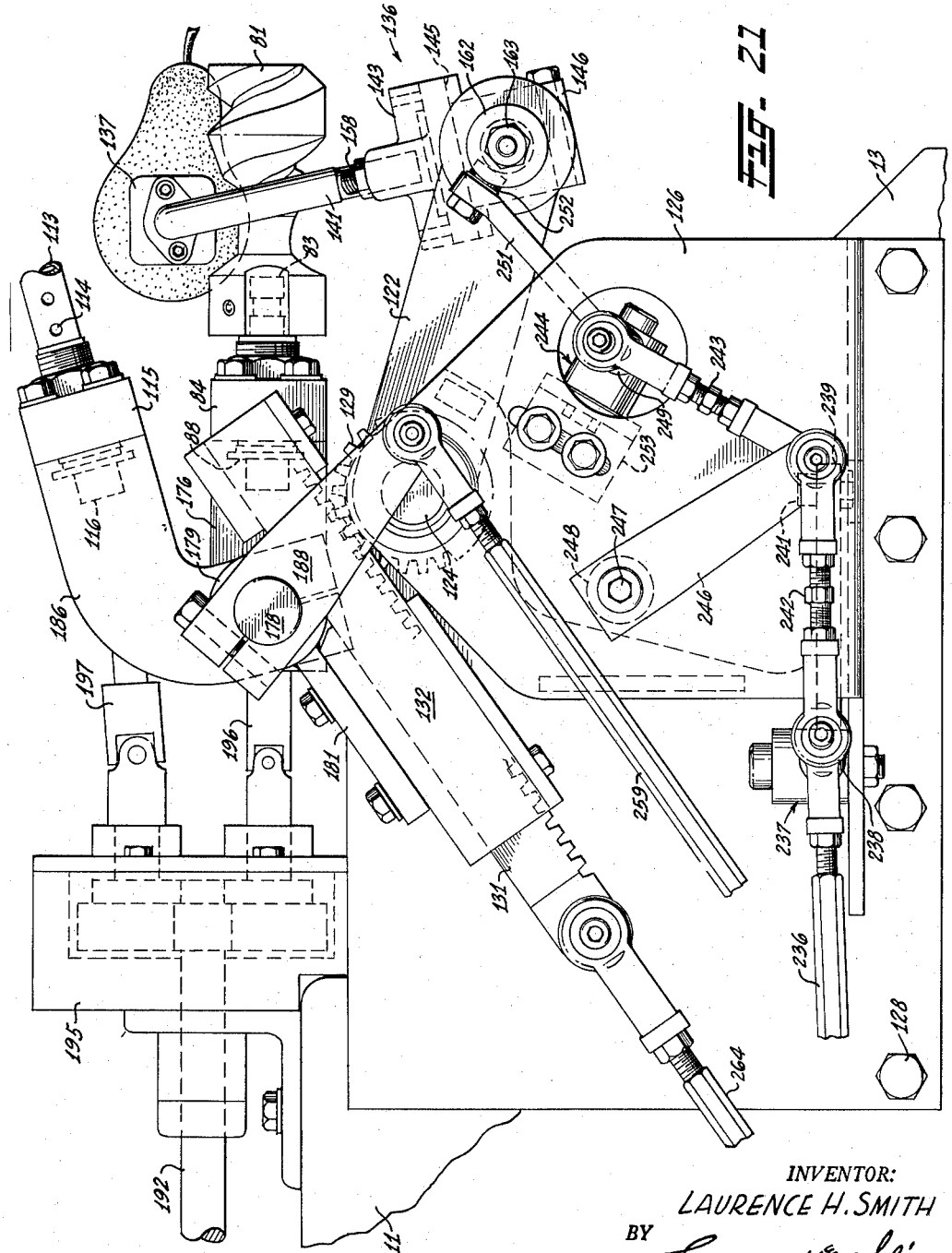

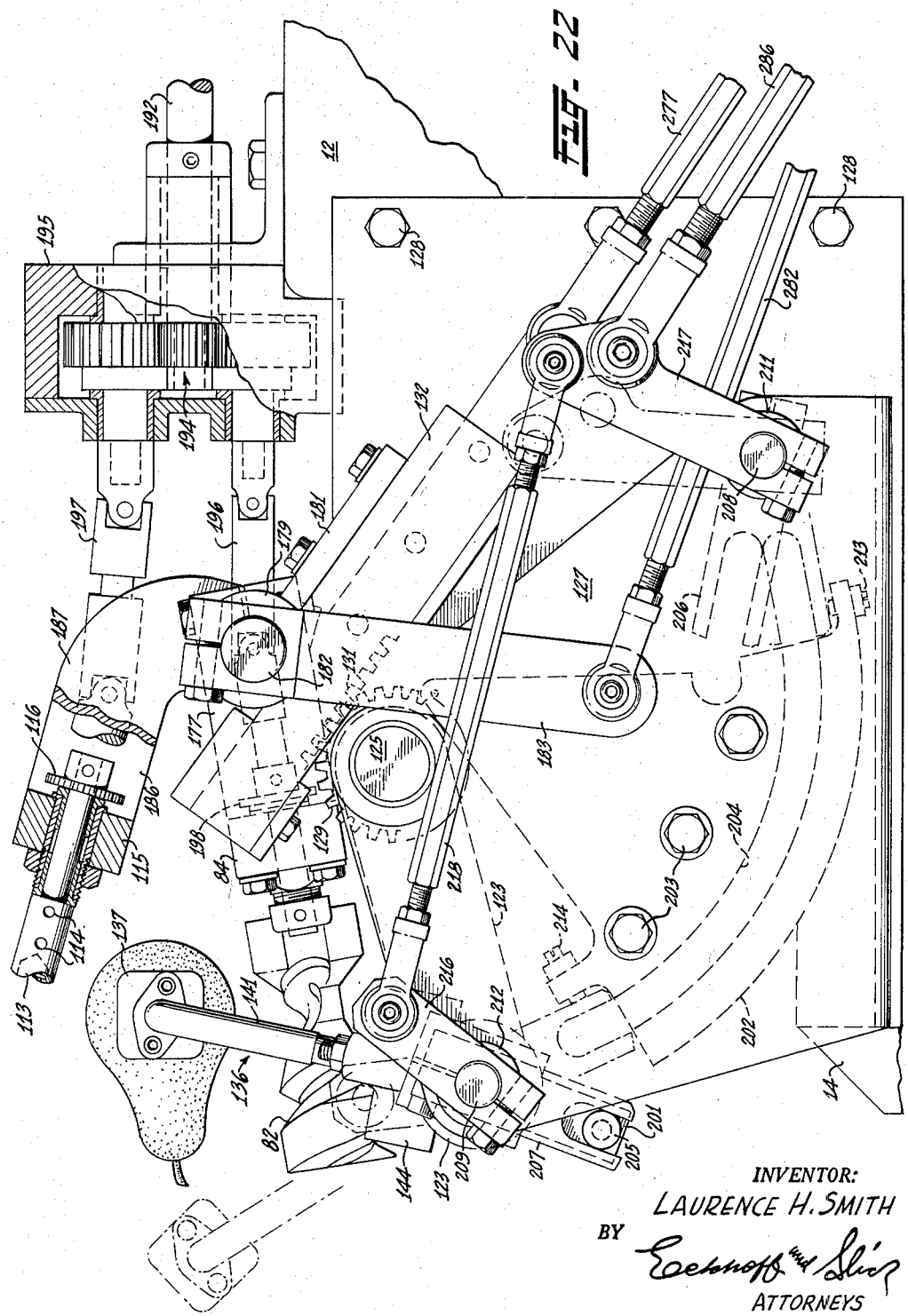

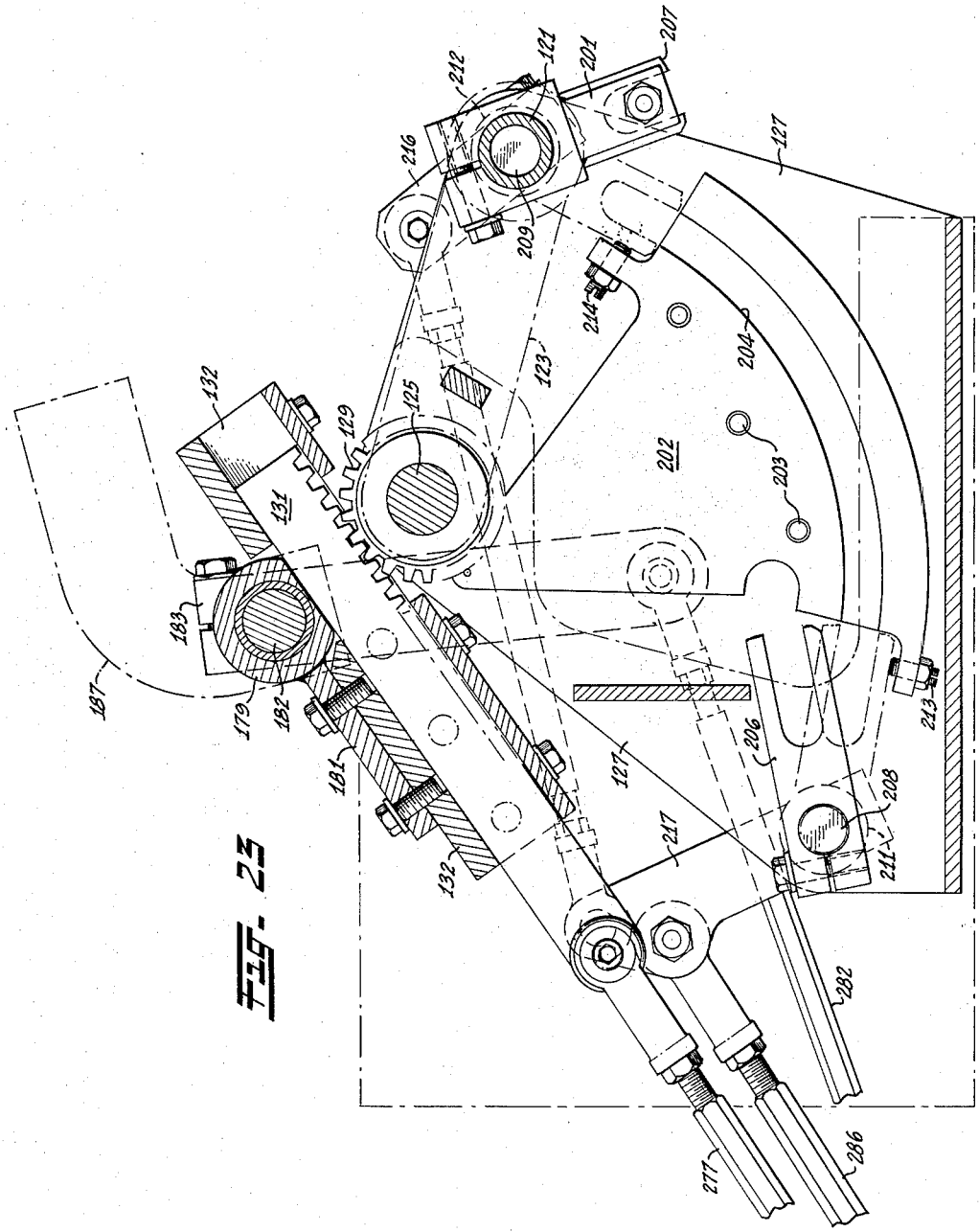

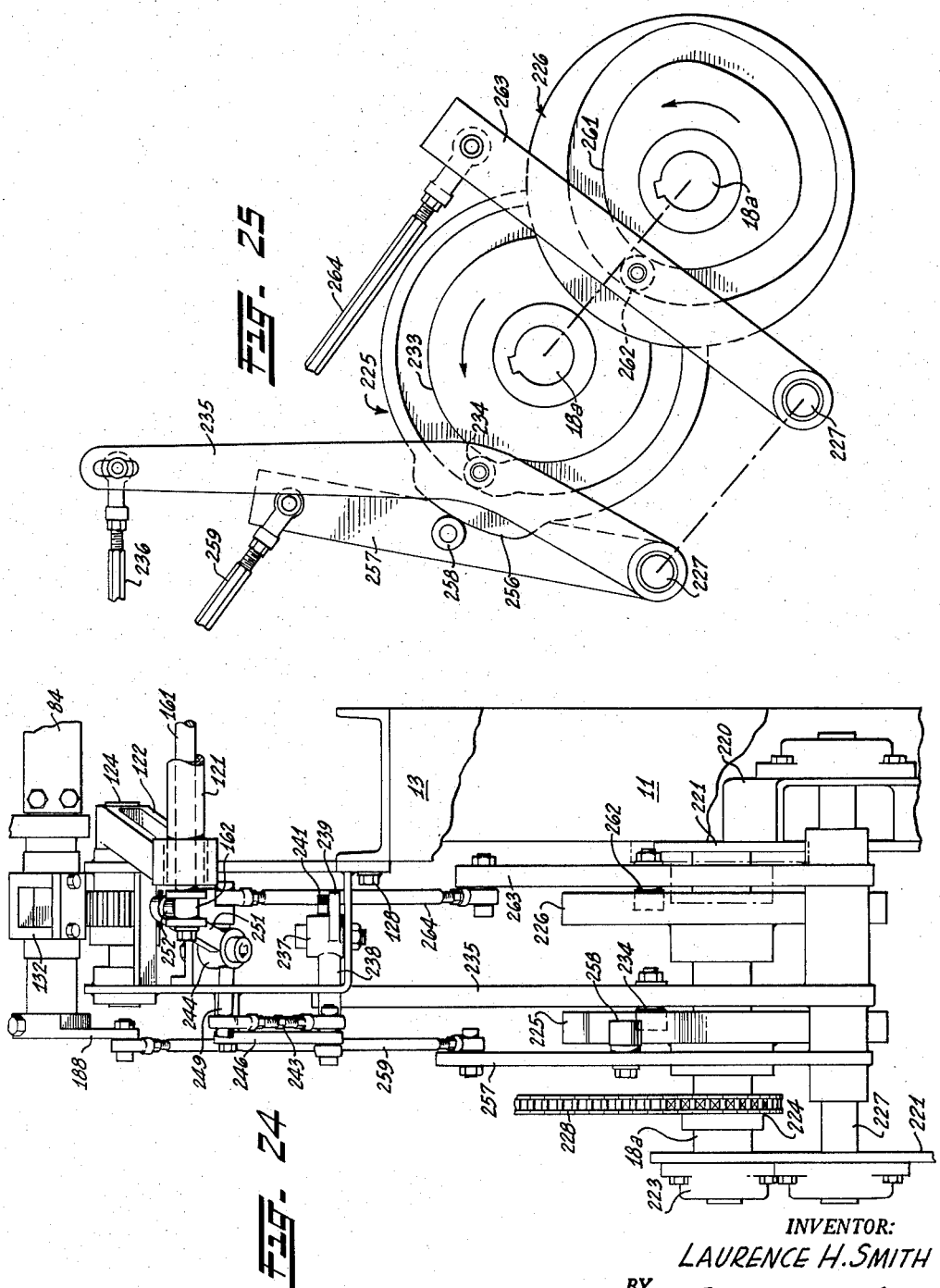

Aug. 11, 1964   L. H. SMITH   3,144,121
PEAR FEEDER
Filed July 2, 1962   16 Sheets-Sheet 10
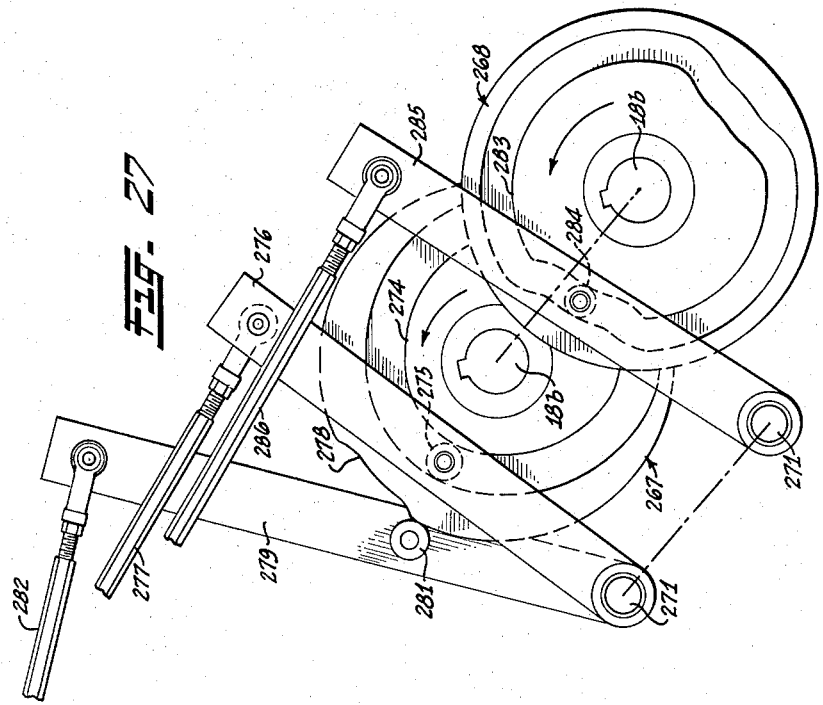
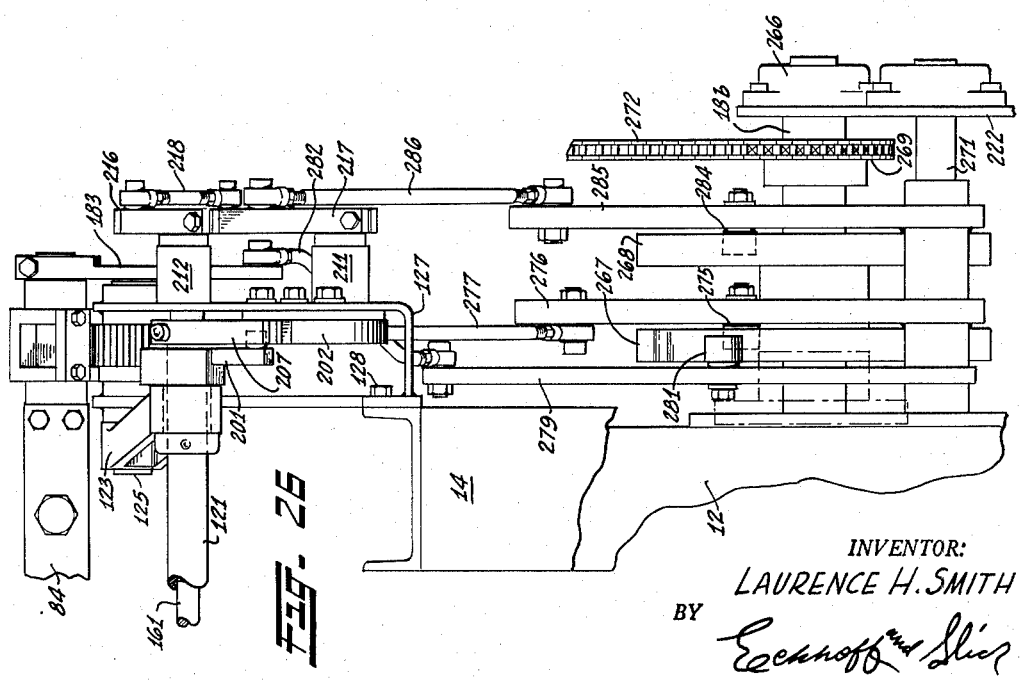
INVENTOR:
LAURENCE H. SMITH
BY
*Eckhoff & Slick*
ATTORNEYS Aug. 11, 1964          L. H. SMITH            3,144,121
                       PEAR FEEDER
Filed July 2, 1962                    16 Sheets-Sheet 11
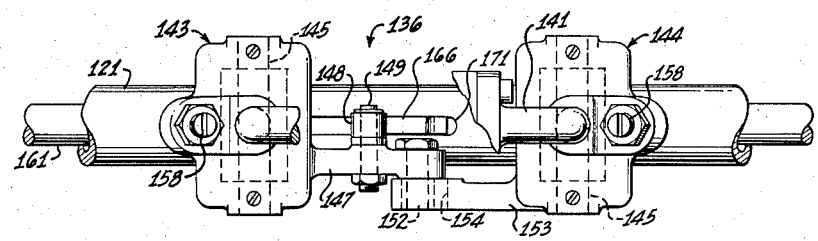
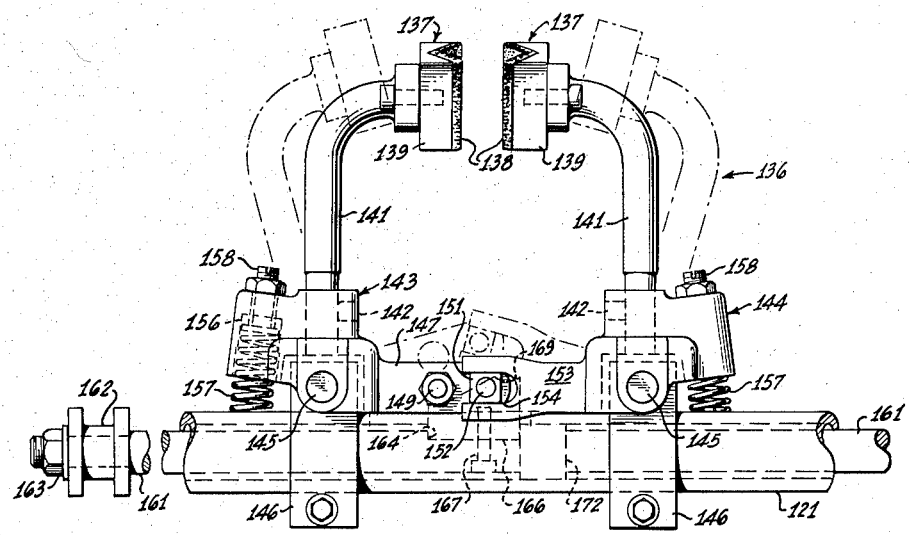
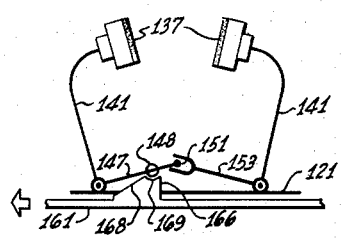
INVENTOR:
LAURENCE H. SMITH
BY
ATTORNEYS Aug. 11, 1964     L. H. SMITH     3,144,121
PEAR FEEDER Filed July 2, 1962     16 Sheets-Sheet 12

INVENTOR:
LAURENCE H. SMITH
BY
*Eckhoff and Slick*
ATTORNEYS

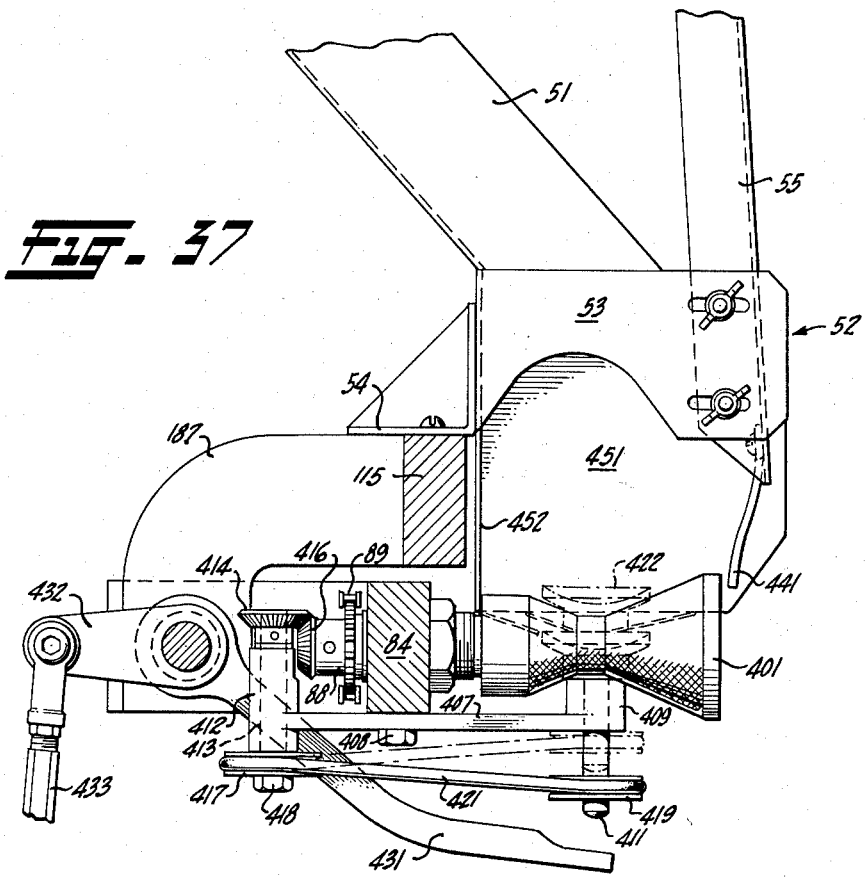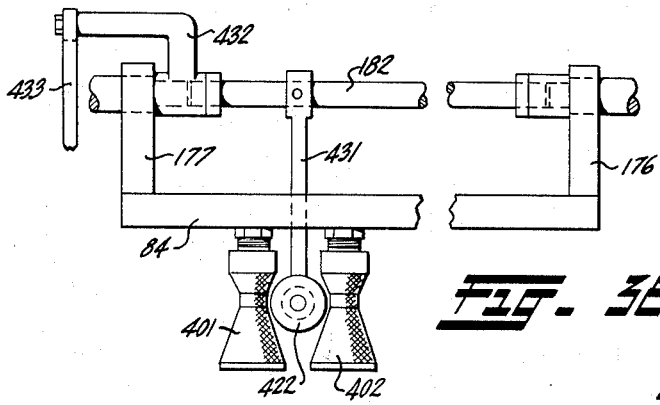

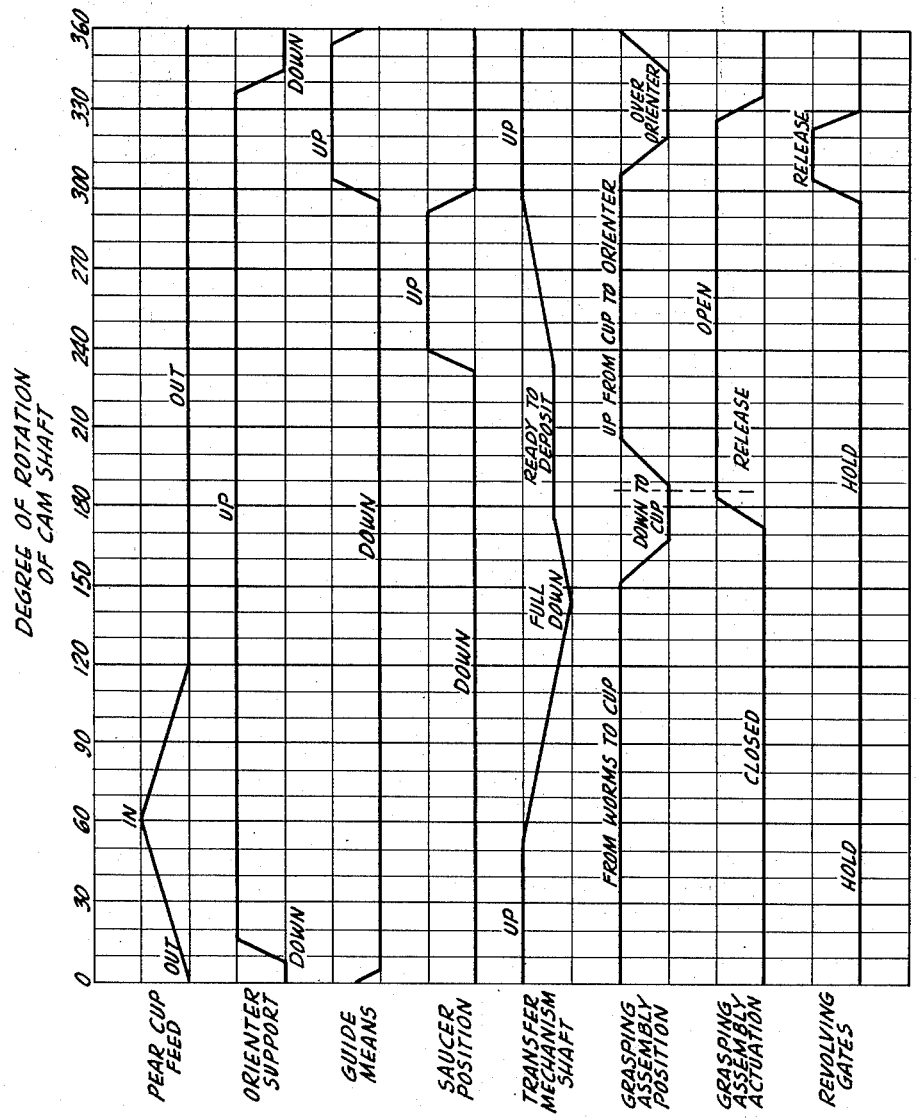

United States Patent Office 3,144,121
Patented Aug. 11, 1964

3,144,121
PEAR FEEDER
Laurence H. Smith, Walnut Creek, Calif., assignor to Atlas Pacific Engineering Company, a corporation of California
Filed July 2, 1962, Ser. No. 208,668
41 Claims. (Cl. 198—33)

This invention relates to a machine for feeding pears one at a time from a loose mass thereof and in a predetermined position of alignment to a machine in which the pears are further processed as, for example, by being cored and peeled.

The machines utilized heretofore for coring and peeling pears have been hand-fed, an operation which involves substantial labor costs to a cannery operator. The machine of the present invention provides an automatic feed for a pear processing machine.

It is in general the broad object of this invention to provide a machine for feeding pears one at a time from a loose mass thereof and delivering the pears in a predetermined position of alignment. The invention includes other objects and features of advantage, some of which, together with the foregoing, will appear hereinafter wherein the present preferred form of apparatus for feeding and orienting pears is disclosed.

In the drawings:

FIGURE 2 is a top plan view of the assembled machine and feeding apparatus including the conveyor feed system.

FIGURE 3 is a front elevation of the assembled machine to illustrate the placement of the various co-acting operating and control mechanisms. In FIGURES 2 and 3 some duplicate parts have been omitted for clarity.

FIGURE 4 is a side elevation of a worm blank prior to machining of the worm helix.

FIGURE 5 is an end view of the worm blank.

FIGURES 6 and 7 are diagrammatic views of the method of machining the worm.

FIGURES 8 and 9 are plan views of a cooperating pair of worms and their supporting bar.

FIGURES 10 through 18 are sequential diagrams showing the relative movement of certain portions of the feeding, positioning and transfer mechanisms.

FIGURE 21 is a fragmentary left end elevation of the operating and control mechanisms and the support bracket for the positioning and transfer apparatus.

FIGURE 22 is a fragmentary right end elevation of the operating and control mechanisms and support bracket for the positioning and transfer apparatus.

FIGURE 23 is a vertical section taken on line 23—23 of FIGURE 3 showing the arcuate guide cam track and the transfer mechanism control lever arms.

FIGURE 24 is a fragmentary elevation of the control cams, connecting links and positioning mechanism at the left end of the machine.

FIGURE 25 is an exploded view of the cams and levers of FIGURE 24.

FIGURE 26 is a fragmentary elevation of the control cams connecting links and positioning mechanism at the right end of the machine.

FIGURE 27 is an exploded view of the cams and levers of FIGURE 26.

FIGURE 28 is a side elevation of one set of pear transfer fingers and grips mounted on the transfer shaft.

FIGURE 29 is a top plan view of a set of pear transfer mechanisms partially broken away to better illustrate the operating links.

FIGURE 30 is a schematic view showing the mode of operation of the transfer mechanism.

TABLE

| Figure No.: | Rotation of cam shaft, degrees |
|---|---|
| 10 | 290 |
| 11 | 335 |
| 12 | 345 |
| 13 | 20 |
| 14 | 90 |
| 15 | 145 |
| 16 | 170 |
| 17 | 210 |
| 18 | 270 |

Figure 32:
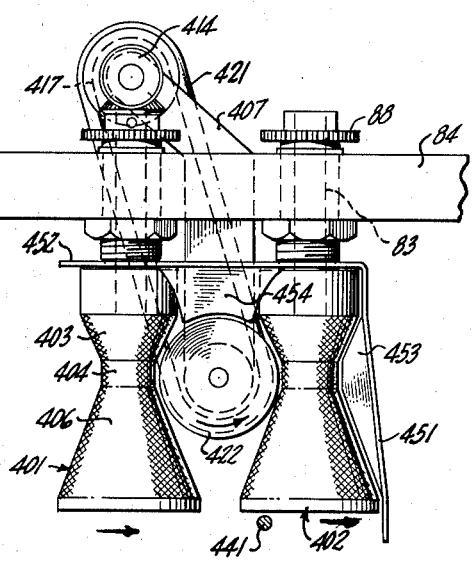
Figure 33:
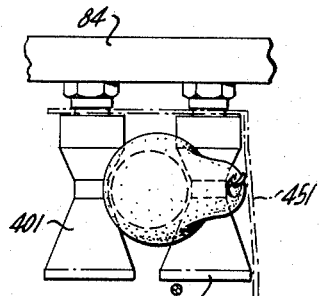
Figure 34:
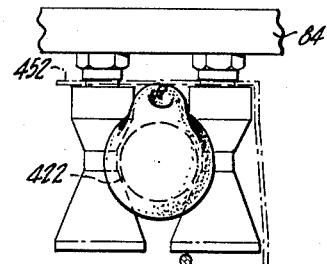

FIGURE 32 is a fragmentary plan view showing other orienting means which can be employed.

FIGURES 33–36 are schematic views illustrating the operation of the alternative orienting means of FIGURE 32.

Figure 35:
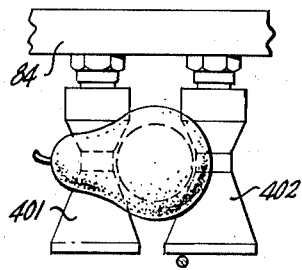
Figure 36:
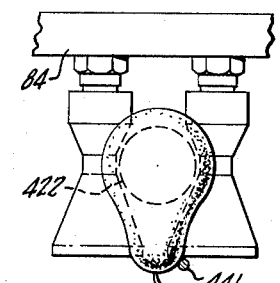

FIGURE 37 is a side elevation illustrating the mechanism for raising and lowering the saucer utilized to turn a pear from the position of FIGURE 35 into the position of FIGURE 36.

FIGURE 38 is a plan view of the mechanism shown in FIGURE 37 with parts omitted for ease of illustration.

Figure 39:
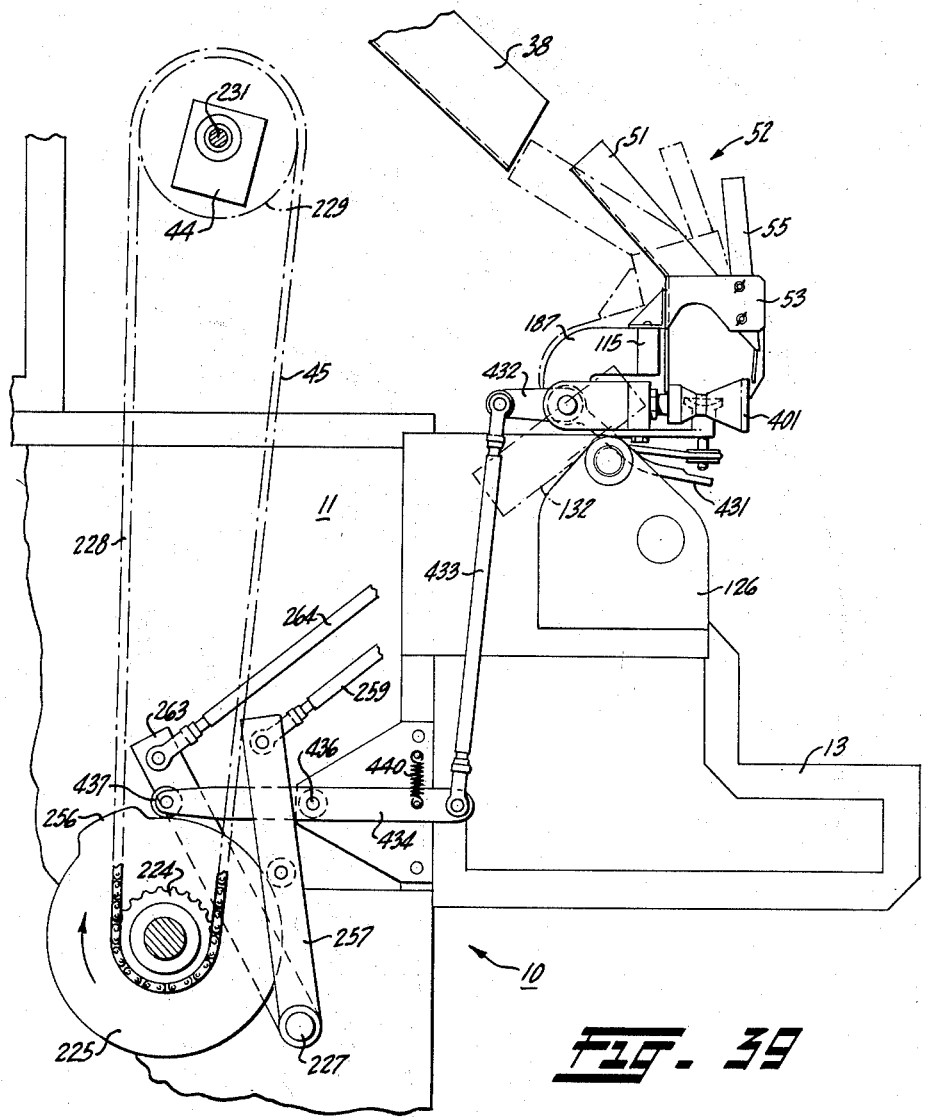

FIGURE 39 is a side elevation showing the operating mechanism for raising and lowering the saucer.

FIGURE 40 is a diagram showing the sequence of operation of the various parts during one complete cycle of operation when the alternative orienting means are employed.

*Pear Preparation Machine in General*

Fastened to the frame 10 at the top rear of end frames 11 and 12 are forwardly extending frame members 13 and 14 which support a series of pear receiving and feeding cup assemblies 15, as well as vertical members 16 to support the incoming fruit conveying and distributing system indicated generally at 17. Journaled in the end supports 11 and 12 and extending transversely through frame 10 is a main drive shaft 18 which is driven by a suitable prime mover as electric motor 19. Shaft 18 is rotated at a reduced speed through gear box 21, shaft 22 and a pulley and belt arrangement 23 (see FIGURE 1).

*Conveyor System*

Conveyor 17 delivers pears from the bulk source by means of endless belt 31 having guides 30 (FIGURE 2). The conveyor belt 31 is tilted by adjustable mounting plates 32 to permit pears to roll through the exits between adjustable baffles 33 onto belt 34 which is slower moving than belt 31. Diagonally mounted arms 35 prevent piling up of fruit so that pears approach multi-bladed revolving gates 36 in a single layer. Tapered divider elements 37 permit one pear at a time to enter a sector of the gate as the gate rotates at ¼ the speed of the basic machine and transfer mechanism, thus to release a single pear at the proper time to delivery chute 38.

Figure 1:
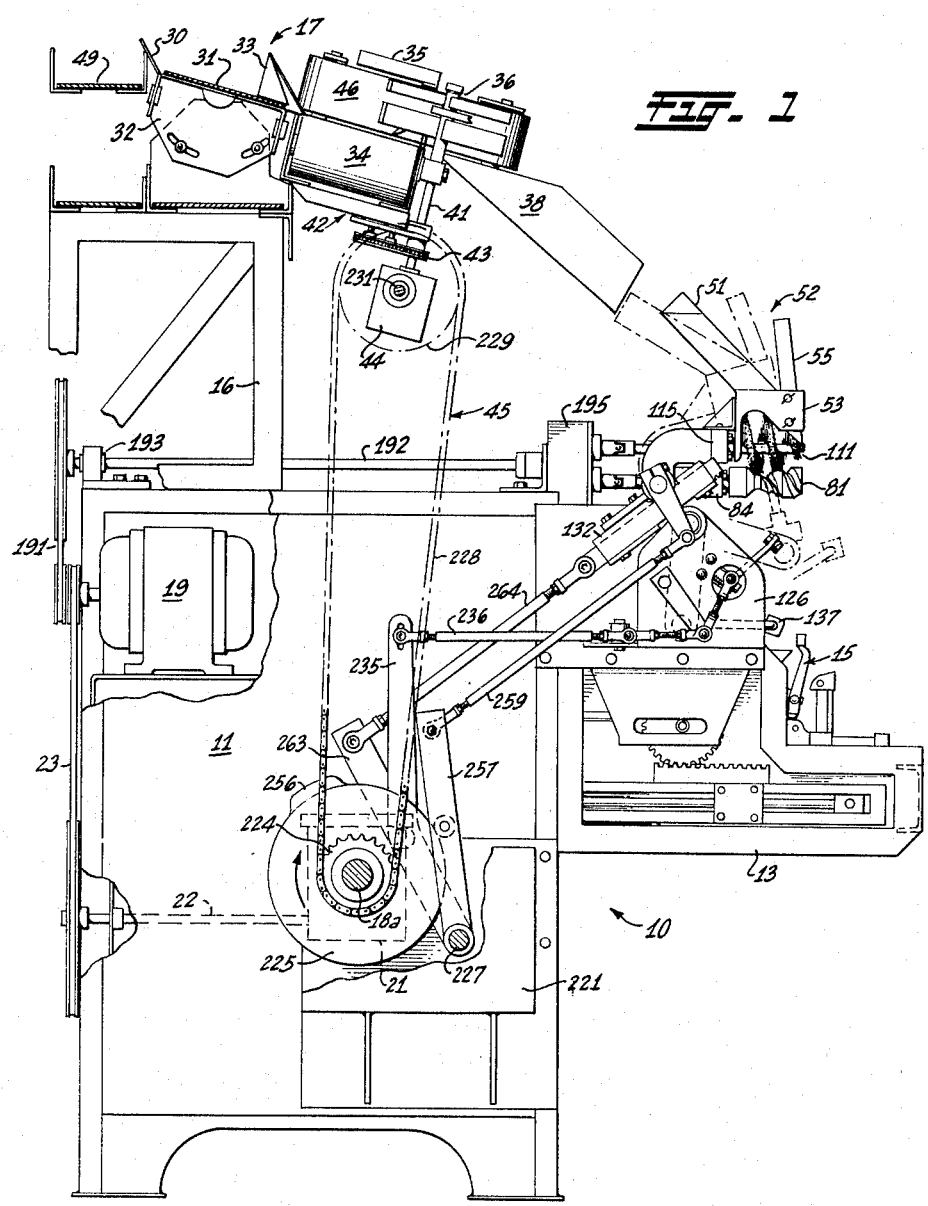
FIGURE 1 is a side elevation of a pear processing machine including feeding, orienting and transfer mechanisms.

Each revolving gate 36 includes four spaced blades or paddles affixed to a generally vertically positioned shaft 41 which is journaled in suitable bearings mounted on the auxiliary conveyor structure 42. Timed rotation of each gate is accomplished through a chain 43 driven through gear box 44 powered from the main drive shaft 18 by a chain and sprocket drive 45 (FIGURE 1).

Belts 34 and 46 are driven by transverse shaft 47 and bevel gear assemblies 48 and 49A journaled in the bracket on the conveyor structure 42.

The second chute 51 is provided with guide structure 52 having an L-shaped metal body 53. The second chute is supported on the brush and guide support 115 by bracket 54. A U-shaped baffle plate 55 is secured to the guide 53 by bolts and wing nuts 56. Plate 57 has a right angle end portion 58 and is pivoted at 59 to lug 61 to form a reciprocaing gate. Slot 62 in the bottom wall of chute 51 provides for passage of end portion 58 of plate 57. Lug 63 fastened to plate 57 is pivoted to link 64 which hinges on a pivot 65 on the frame. Movement of the brush and guide support 115 is counterclockwise as viewed in FIGURE 19 from the position shown in solid lines to that shown in broken lines. This moves chute 51 towards delivery chute 38, causing gate 58 to pass through slot 62 to block chute 51. Curved wires 66 and 67 are fastened to the rear wall of guide body 53 by screws 68.

*Orienting Worms and Brushes*

To effect orientation of a pear, and particularly the turning of the pear into a predetermined position of alignment, a pair of like worms 81 and 82 are provided. These are mounted at one end upon spindles 83 which, in turn, are supported in suitable bearings in the cross-bar member 84. Each spindle 83 fits into a receptacle 85 provided in one end of the worm, and each worm is retained in place upon a spindle by set screw 87. Each spindle carries a sprocket 88 thereon and a chain 89 is trained about the several sprockets as appears in FIGURE 20. In the machine shown, the worms rotate in pairs in the same direction and at the same speed or nearly so.

The worms are formed from a suitable blank, such as that indicated at 101 in FIGURE 4. The blank includes cylindrical hubs 102 and 103 at opposite ends thereof, hub 102 being utilized in the mounting of the worm while hub 103 is utilized only to provide support during the machining of the worm. The blank 101 also includes between the hubs cylindrical portions 104 and 105 connected by an intermediate tapered portion 106, the cylindrical portion 105 being smaller in diameter than the cylindrical portion 104.

The worms each include a cylindrical thread and a tapered thread of the same lead. To form the threads of the worms the blank 101 is preferably supported in a milling machine having a dividing head and a lead attachment. A straight cylindrical thread is cut with a thread cutting milling cutter as appears in FIGURE 6, wherein the rotating cutting tool 107 is shown in cutting position normal to the longitudinal axis of the blank. The nose of the cutting tool shown in FIGURE 6 is at 66°, but one can use a tool having another shape of nose, such as a square shape, if desired. That tool nose shown is employed because the worm formed by utilizing a tool having such a shape can be used as a pattern to form a mold for subsequent die-casting reproduction of the worms.

The cylindrical thread is formed with a suitable lead and that shown was 1.5 inches. As the cylindrical thread is cut along the periphery of the blank, the tool will reach a position in which the cutter center line coincides with the junction of cylinder 104 and taper 106. When this position of the tool is attained (see the full line position of the tool in FIGURE 6), the machine is stopped and the dividing head on the milling machine is tilted upwardly from the horizontal through an acute angle and the cutter head is tilted from the vertical through a like acute angle. In the screw shown, the dividing head was tilted 20° from the horizontal axis A—A while the cutter head was turned 20° from the vertical.

The lead is also adjusted so that the end of the tool travels a distance equal to the lead of the cylindrical screw, the distance being measured in the direction of the major axis A—A in FIGURE 6 which the blank formerly occupied. Thus, in the specific screw under discussion, the lead was changed from 1.5 inches to 1.598 inches; this change in lead will be obvious to those skilled in the art, for the tool must travel along the hypotenuse of a triangle rather than along one side.

In starting the cut for the tapered portion, one should blend the start of the tapered lead on both sides of the groove cut in the cylindrical portion 104. The tapered cut is continued across the cylindrical portion 105 until the side of the groove being cut is approximately tangent to the start of the cylindrical portion 102. When the screws are cut, end 103 is removed.

The completed worms will have the configuration shown in FIGURES 8 and 9. While the blank shown in FIGURE 4 includes cylindrical portions 104 and 105 connected by the intermediate tapered portion 106 and with the hub 102 connected by another tapered portion to the cylindrical portion 105, the blank has been shown in this fashion to simplify the explanation of its manufacture. In actual practice, the various portions are faired into one another so that a continuous smooth surface is provided. Thus, each worm has a configuration approximating that of a pear. Basically, the combined upper exposed surface area of the two parallel and adjacent worms is such that it approximates the inverse of the surface configuration of a pear. They provide support for a pear, rotating the pear about its major longitudinal axis until the pear is in the position shown in FIGURE 9. A pear positioned as in FIGURE 8 will be quickly turned by the worms into that position shown in FIGURE 9, in which the major axis of the pear extends generally parallel to the longitudinal axis of the worms 81 and 82, the stem end of the pear being adjacent the cylindrical portion 104 in each worm, while the butt end of the pear fits along the tapered portion 106 and within the larger space provided by the smaller cylindrical portion 105.

Figure 19:
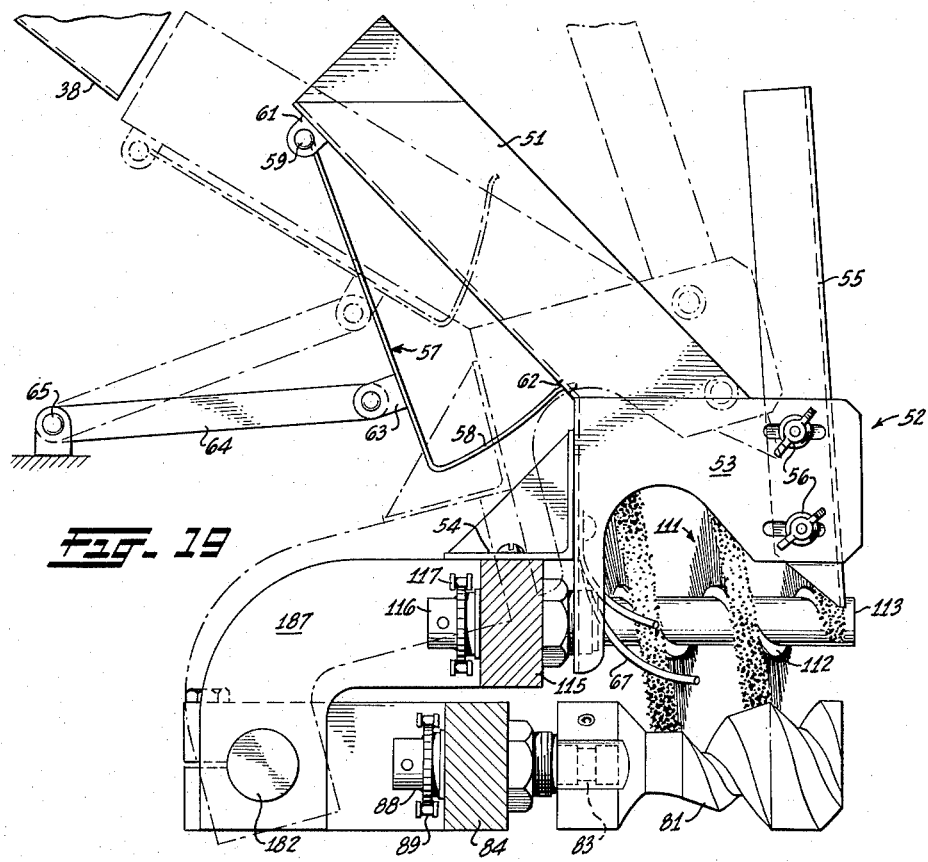
FIGURE 19 is a fragmentary side view, partially in section, of the forwarding chute, guide means and the brush and worm support means.
Figure 20:
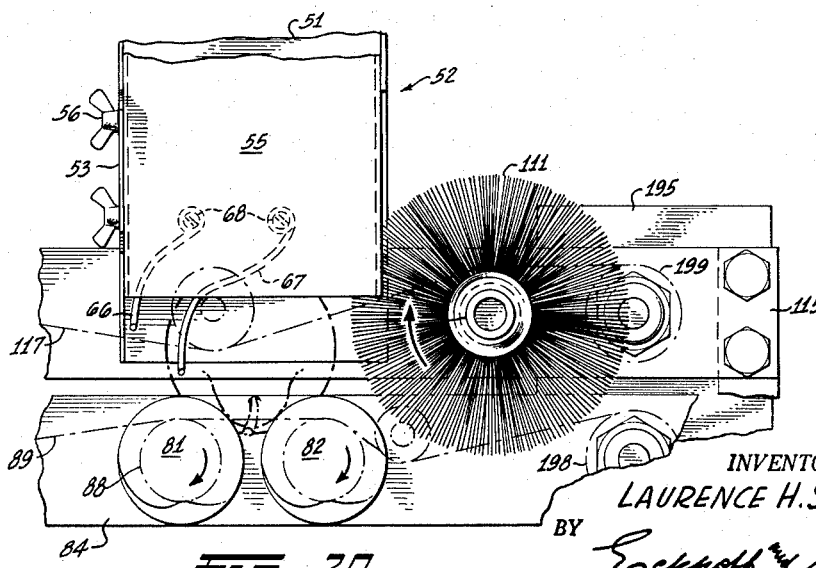
FIGURE 20 is a partial front elevation of the parts shown in FIGURE 19.

This turning movement of the pear is further facilitated, particularly if the pear has a stem, by the utilization of curved guide wires 66 and 67, shown in FIGURES 19 and 20. These wires engage the projecting stem on a pear and, as the pear is rotated, cause the pear to swing about its base with the result that the pear quickly moves into the position shown in FIGURES 9 and 20.

A pear lacking a stem or one which projects with its stem end over worm 82 rather than over worm 81 will be engaged by a rotating spiral brush, generally indicated at 111. The brush will propel the pear to a position with the stem end over worm 81 and during its rotation the stem end may or may not contact wires 66 and 67; the sloping shape of wires 66 and 67 assist the rotation of the pear into a position over worm 81. In this position it rapidly swings about its base into the position shown in FIGURE 9.

As is shown in FIGURES 19 and 20, brush 111 is located adjacent each pair of worms. The brush comprises a spiral-shaped bristle holder 112 carrying a spiral brush, the holder being bolted to a hollow shaft 113 at its inner end through holes 114 (see FIGURE 22). Shaft 113 is journaled in suitable bearings in the cross-bar member 115 which also supports guide means 52. Each shaft carries a sprocket 116 thereon and a chain 117 is trained about the sprockets as appears in FIGURE 20, the brush rotating oppositely to the motion imparted to the pear but in the same direction as the worms. The brush acts as a flexible wall to return the stem end of a pear which may become engaged with the brush.

As has been set forth, the worms rotate in pairs in the same direction and at the same speed or nearly so. Viewed from their unsupported ends, the worms turn clockwise. The effect is to turn and rotate a pear until its major axis is parallel to the longitudinal axis of the worms and its stem end is adjacent the large end of the worms. In this position, the pear merely rotates as the worms turn. Turning of a pear is facilitated by the screw thread cut in the worms for about one-tenth of the pears placed at random on the worms will first engage the worms with a stem or a stem end. The thread will retain the stem or stem end and quickly turn the pear into the desired position of alignment. While the screw thread can be omitted from the worms, the orienting action of the worms is improved by its presence.

The Sequence of Operation

The sequence of operation of the apparatus is shown in simplified form in FIGURES 10 to 18, in which the various essential elements are illustrated in some of the various positions which they occupy during the cyclic operation of the machine. For convenience, these will be discussed in the order in which they are shown in the several views. Referring to FIGURE 10, a pear is shown in aligned position on the worms 81 and 82 with the transfer mechanism generally indicated at 120 approaching the aligned fruit to engage the pear between the grips 137. Referring further to FIGURE 10, it will be noted that forwarding chute 51 is spaced from the end of delivery chute 38 and that gate 58 in the forwarding chute is in the down position. The movement of the various parts is substantially continuous, and as shown in FIGURE 11, grips 137 have engaged the pear, guide means 52 has rocked around its support shaft and the forwarding chute 51 has moved into a position in which it can receive fruit synchronously released through the delivery chute 38. The gate 58 in the forwarding chute, however, has been moved up into a blocking position in the chute so that the fruit is maintained momentarily in the chute as appears in FIGURE 12.

Just before the transfer mechanism 120 commences to move the fruit from its aligned position on worms 81 and 82, the worm support is rocked downwardly as a unit about its support shaft as shown in FIGURE 12, the fruit being temporarily maintained in its horizontal position by the grasping mechanism. With the worms moved out of the way to permit the passage of the pear, the grip supports 141 swing outwardly or clockwise approximately 45° to the position shown. As the several components are shown in FIGURE 13, the worms have been returned to their horizontal position and the guide means 52 is in place over the worms; also, gate 58 has been moved out of the way as the forwarding chute moved downwardly to permit discharge of the fruit from the chute through guide means 52 to a position over the worms.

During this portion of the cycle, the transfer mechanism continues its movement, turning the fruit gradually from a position in which it is aligned with its major axis horizontal into a position in which it is aligned with its major axis in a vertical position; this appears in FIGURE 14 wherein the movement of the pear has been partially effected while the receiving cup 15 is being returned to its fruit receiving position.

The next pear now positioned on the worms 81 and 82 is in turn being rotated into the desired position of alignment. As appears in FIGURE 15, the cup 15 has moved into position to receive the fruit while the transfer arms 122 have reached the innermost position and fingers 141 hold the pear slightly above the cup 15. The transfer arms 122 then move forward slightly while fingers 141 are rotated clockwise approximately 22°, as will be seen upon comparing the respective positions of the transfer mechanism in FIGURE 15 and FIGURE 16. In the meantime, the pear on the worms has been turned into a position in which the stem is aligned toward the outward end of the worms. The transfer mechanism then releases the pear which drops stem end down into the cup and fingers 141 are rotated counterclockwise as in FIGURE 17 for clearance purposes.

The transfer mechanism continues its movement from the position shown in FIGURE 18 to the position shown in FIGURE 10 to engage the next pear. During this sequence of operations the cup is moved through 90° to advance the fruit onto a coring mechanism such as spindle 86 in application No. 766,579, now Patent No. 3,055,408.

Transfer Mechanism

The transfer mechanisms generally 120 are best shown in detail in FIGURES 21, 22, 23, 28 and 29 and comprise a swingably hollow shaft 121 extending transversely across the front of the processing machine. The shaft 121 is pivotally supported at its ends in suitable bearings each provided in the outer end of a pair of lever arms 122 and 123 which are fastened at their inner ends to stub shafts 124 and 125 journaled in bearings mounted on brackets 126 and 127. These brackets also serve as supports for additional elements and are affixed to the forwardly extending frame members 13 and 14 respectively, as with bolts 128 (FIGURES 21 and 22). Each stub shaft has a gear wheel 129 keyed thereon for engagement with a driving gear rack 131 slidably positioned in U-shaped housing 132, one of which is rigidly fastened to each bracket 126 and 127.

A series of pear grasping mechanisms indicated generally at 136 are mounted on shaft 121 at spaced locations to match the spacing of the several worm assemblies. Each grasping mechanism comprises a pair of grips 137, incorporating a roughened resilient pad 138 fastened, as by cementing, to a grooved backup member 139 bolted to a mounting flange at the upper curved extremity of fingers 141. The fingers 141 are fastened as with set secrews 142 in oppositely facing spring-biased fittings 143 and 144 which carry pivot pins 145, journaled in mounting blocks 146 securely bolted to swing shaft 121.

Fitting 143 is fabricated with an integral extending arm 147 which has mounted thereon an actuating roller 148 on shaft 149 and a (sliding) guide block 151 on bolt 152. Fitting 144 is fabricated with an integral extending, bifurcated arm 153 which receives guide block 151 in slot 154 thus providing a toggle joint. Each of fittings 143 and 144 is provided with a recess 156 for housing a compression spring 157. An adjusting screw 158 with lock nut is incorporated to regulate the amount of spring pressure and the resultant grasping force to be applied by grips 137 on the pear.

Located co-axially within hollow shaft 121 is a rod 161 which extends beyond the left end of shaft 121. A portion of the left end of rod 161 is stepped down in diameter to receive a spool-like actuating member 162 secured in place by a nut and washer 163. A series of spaced grooves 164 are cut into rod 161 at each grasping mechanism to receive cam plates 166 fastened into place as with bolts 167. Cams 166 have an inclined surface or ramp 168 which terminates at its upper end in an arcuate notch 169 for a purpose to be described. Slots 171 are cut into the upper surface of shaft 121 to permit linear movement of the cams 166. In addition, spaced sleeve bushings 172 are located, as by a drive fit, inside the shaft 121 at each mechanism 136 to provide a guide bearing for rod 161.

The operation of the pear grasping mechanisms is controlled by the reciprocating motion of rod 161 within shaft 121. As shown in solid lines in FIGURE 28, springs 157 act to rotate the grips 137 toward each other, or, in function, to close upon and grasp a pear (not shown). However, when the inner rod 161 is pulled toward the left by a force exerted on spool 162, roller 148 on arm 147 rides up ramp 168 of cam plate 166 to sit in notch 169. It is evident that upward movement of roller 148 rotates arm 147 in a counterclockwise direction and through the toggle joint arrangement, guide block 151 rotates arm 153 in a clockwise direction. Thus, fittings 143 and 144, along with their fingers 141 and grips 137, are rotated in opposite directions against the pressure of springs 157 to cause the grasping mechanisms 136 to assume the open or releasing position as depicted in broken lines in FIGURE 28 and diagrammatically illustrated in solid lines in FIGURE 30.

*Worm Operating and Control Mechanisms*

The cooperating pairs of worms 81 and 82 are rotatably mounted on spindles 83 fastened to cross-bar 84 as previously stated. Cross-bar 84 is bolted at its left and right ends to rectangular lever arms 176 and 177 located above the forwardly extending frame members 13 and 14 in frame 10. Lever arm 176 located at the left end is pivotally mounted on a stub shaft 178 journaled in a sleeve bearing 179 welded to plate 181 which is rigidly affixed to the lefthand rack housing 132 as by bolting. Lever arm 177 at the right end is securely fastened to a stub shaft 182 journaled in a sleeve 179 and plate 181 mounted on the righthand rack housing 132. An operating lever arm 183 is also securely fixed to stub shaft 182 to provide a means for controlling the angular movement of cross-bar 84 and the worms mounted thereon.

*Guide Means and Brushes*

Pear guide structures 52 and rotating brushes 111 are mounted on the cross-bar 115 which is located parallel to and above cross-bar 84. L-shaped lever arms 186 and 187 are bolted to cross-bar 115 at its ends to serve as swinging support members. Arm 186 is securely fastened to the inner end of stub shaft 178 to which is also affixed an operating lever 188 for controlling the angular movement of cross-bar 115 and the guide means 52 mounted thereon, including the forwarding chutes 51 and aligning brushes 111.

*Worm and Brush Rotation*

As previously set forth, worms 81 and 82 are rotatably mounted on lower cross-bar 84 and are driven by means of sprockets 88 and chain 89; and brushes 111 are rotatably mounted on cross-bar 115 and are driven by sprockets 116 and chain 117. Power to operate chains 89 and 117 is obtained from motor 19 through belt and pulley arrangement 191 which rotates a transverse shaft 192 journaled at its rear end as at 193. Shaft 192 drives reducing gear assembly 194 in gear box 195 which is mounted on the right end support frame 12 (as shown in FIGURE 22). The two output gears of assembly 194 are attached to slip-type universal joints 196 and 197 which drive sprockets 198 and 199 (FIGURE 20) rotatably mounted on the rear side of cross-bars 84 and 115. Chains 89 and 117 engage sprockets 198 and 199 to rotate the worms and brushes.

*Transfer Mechanism*

Shaft 121 having the pear grasping assemblies 136 mounted thereon is positioned by the reciprocating movement of the two racks 131 engaged with gears 129 to swing lever arms 122 and 123 as stated. An operating lever 201 is secured to the right end of shaft 121 to control the relative angular position of the grasping assemblies 136 during the movement of the shaft while transferring fruit from the pick-up position on worms 81 and 82 to the release position over the receiving cups 15.

Referring to FIGURES 22 and 23, a generally triangular shaped plate 202 is shown fastened to the righthand end bracket 127 as by bolts 203. A cam track 204 is cut into plate 202 to receive a cam roller 205 (FIGURE 22) mounted on operating lever 201. Located at each end of and functioning with cam track 204 are bifurcated levers 206 and 207 affixed to the inner ends of short shafts 208 and 209 journaled in bosses 211 and 212 welded to bracket 127. Adjustable set screws 213 and 214 are provided as indicated in cam plate 202 to limit the travel of levers 206 and 207 for proper alignment with cam track 204. As best seen in FIGURE 22, a lever arm 216 is fastened to the outer end of shaft 209 and an intermediate lever arm 217 is affixed to the outer end of shaft 208. Arms 216 and 217 are interconnected at their upper ends by an adjustable link member 218. Movement of lever arm 217 in a counterclockwise direction will cause simultaneous rotation of shafts 208 and 209 together with their (inner) bifurcated levers 206 and 207 from the position shown in solid lines to that shown in broken lines in FIGURE 22 and wherein the slots of levers 206 and 207 are in exact alignment with cam track 204 to facilitate passage of cam roller 205. It is obvious that lever 217 will be moved to the position shown in solid lines only when shaft 121 is in the full up position illustrated or conversely, in the down position at the extreme opposite end of travel.

This combination of arcuate track and slotted levers together with the controlled movement of lever arm 217 permits the desired control of the angular position of the grasping mechanisms through a complete cycle.

*Cam Disks and Linkages*

Mounted on the support frames 11 and 12 at each end of main frame structure 10 are box-like housings 221 and 222 which serve to support and shield the extension shafts, cam disks, cam following levers, sprockets and pivot shafts which have been appended to the pear processing machine to operate and control the feeding, positioning and transfer apparatus. FIGURES 24 and 26 of the accompanying drawings illustrate the general layout of the control cams and connecting linkages to the operating members. FIGURES 25 and 27 show the general arrangement of the cam disks with their cam tracks and follower levers.

Located at the left end of the processing machine is an extension shaft 18a bolted or otherwise fastened to main drive shaft 18 and journaled in bearing block 223 mounted on the outer wall of housing 221. Keyed or otherwise secured to shaft 18a are a drive sprocket 224 and cam disks 225 and 226. A shaft 227 parallel to shaft 18a is also mounted between housing 221 and an extension bracket 220 attached to housing 221. The shaft 227 provides a pivot for the cam follower lever arms associated with the cam disks. A chain 228 engages sprocket 224 (FIGURE 3) to drive an upper sprocket 229 and shaft 231 connected to gear box 44 for revolving the gates 36 to release fruit to the delivery chutes as required.

Cam disk 225 is formed with a contoured cam track 233 (FIGURE 25) designed to control the opening and closing of the grasping mechanisms 136. This is accomplished by the use of a cam follower roller 234 mounted on lever arm 235 pivoted at its lower end on shaft 227 and connected at its upper end to a linearly-adjustable ball joint linkage assembly 236 (FIGURE 21). A bell crank member 237 is pivotally mounted on the base plate of bracket 126 and has one lever arm 238 connected to linkage 236. The second arm 239 has a roller 241 mounted thereon to engage the spool 162 to cause linear movement of rod 161 to the left to open or inactivate the grasping mechanisms 136 and thus release the pears when the transfer mechanisms are properly located over the receiving cups 15.

Additional adjustable linkages 242 and 243 are provided to interconnect linkage 236 and bell crank 237 to a second bell crank 244. One end of linkage 242 is connected to arm 238 of bell crank 237 and the other to the lower end of idler lever 246 pivotably mounted at 247 to a boss 248 welded to the left wall of bracket 126. Linkage 243 is connected between the lower end of lever 246 and arm 249 of bell crank 244. Lever arm 251 of bell crank 244 has a roller 252 mounted thereon to engage spool 162 to cause movement of rod 161 to the right, thus permitting the spring-biased grasping mechanisms 136 to grip a pear when the transfer mechanism 120 is properly located adjacent the worms. Bell crank 244 is pivotally mounted on an L-shaped bracket 253 adjustably bolted to the side wall of bracket 126.

Although both bell cranks 237 and 244 operate simultaneously each time linkage 236 is moved, it should be set forth that their functions are directly opposite and that each bell crank is functioning singly to accomplish its intended purpose only when engaged with spool 162.

A lobe or protuberance 256 is incorporated on the periphery of cam disk 225 to position the cross-bar 115 supporting guide means 52 and brushes 111. This is accomplished through a lever arm 257 pivotally supported on shaft 227 and having a cam follower roller 258 riding on the outer surface of cam disk 225. An adjustable linkage 259 is interconnected between the top of lever arm 257 and operating lever 188. Due to the weight of cross-bar 115 and its accessories no spring is required for constant engagement of roller 258 and cam disk 225.

Cam disk 226 is formed similarly to disk 225 and has a contoured cam track 261 designed to control the arcuate movement of shaft 121 of the transfer mechanism. A cam follower roller 262 is mounted on a lever arm 263 keyed at its lower end to shaft 227 and interconnected at its upper end to driving gear rack 131 by a linkage 264.

Referring to FIGURES 2, 3, 22, 23, 26 and 27, an extension shaft 18b is fastened to main drive shaft 18 and journaled in bearing block 266 mounted on the outer wall of housing 222. Keyed or otherwise affixed to shaft 18b are cam disks 267 and 268 and a drive sprocket 269. A shaft 271 parallel to shaft 18b is also supported in the same manner as shaft 227, but on the opposite side of the machine. Shaft 271 provides a pivot support for the cam follower lever arms operated by the cam tracks. A chain 272 engages sprocket 269 to drive an upper sprocket 273 to provide power for conveyor belt 34 and auxiliary belt 46 through mechanism previously explained.

Cam disk 267 is formed with a contoured cam track 274 of identical configuration to cam track 261 of cam disk 226, since the two cams perform the same function of operating a rack 131 engaging gear 129 attached to a support arm at each end of the transfer mechanism. A cam follower roller 275 is mounted on a lever arm 276 pivoted on shaft 271 and interconnected by an adjustable linkage 277 to rack 131. An indentation or notch 278 is formed in the periphery of cam disk 267 (FIGURE 27) to provide for a temporary lowering movement of the cross-bar member 84 which supports worms 81 and 82. A lever are 279 is provided for this purpose supported on shaft 271 and having a cam follower roller 281 engaging the outer surface of disk 267. A linkage 282 interconnects the top of arm 279 and worm support operating lever 183.

The cam disk 268 incorporates a contoured cam track 283 designed to provide control of the angular displacement of grasping mechanisms 136 relative to lever arms 122 and 123 at each end of the arcuate travel of shaft 121. A cam follower roller 284 mounted on a lever arm 285 and pivoted on shaft 271, engages the cam track 283 to operate a linkage 286 interconnected between the top of arm 285 and operating lever 217.

Thus, it will be seen that cam disk 225 controls operation of the pear grasping mechanisms and the cross-bar supporting the guide means and brushes; cam disks 226 and 267 control the arcuate movement of the transfer shaft, with disk 267 also controlling the cross-bar supporting the worms; and cam disk 268 controls the angular displacement of the grasping means.

Figure 31:
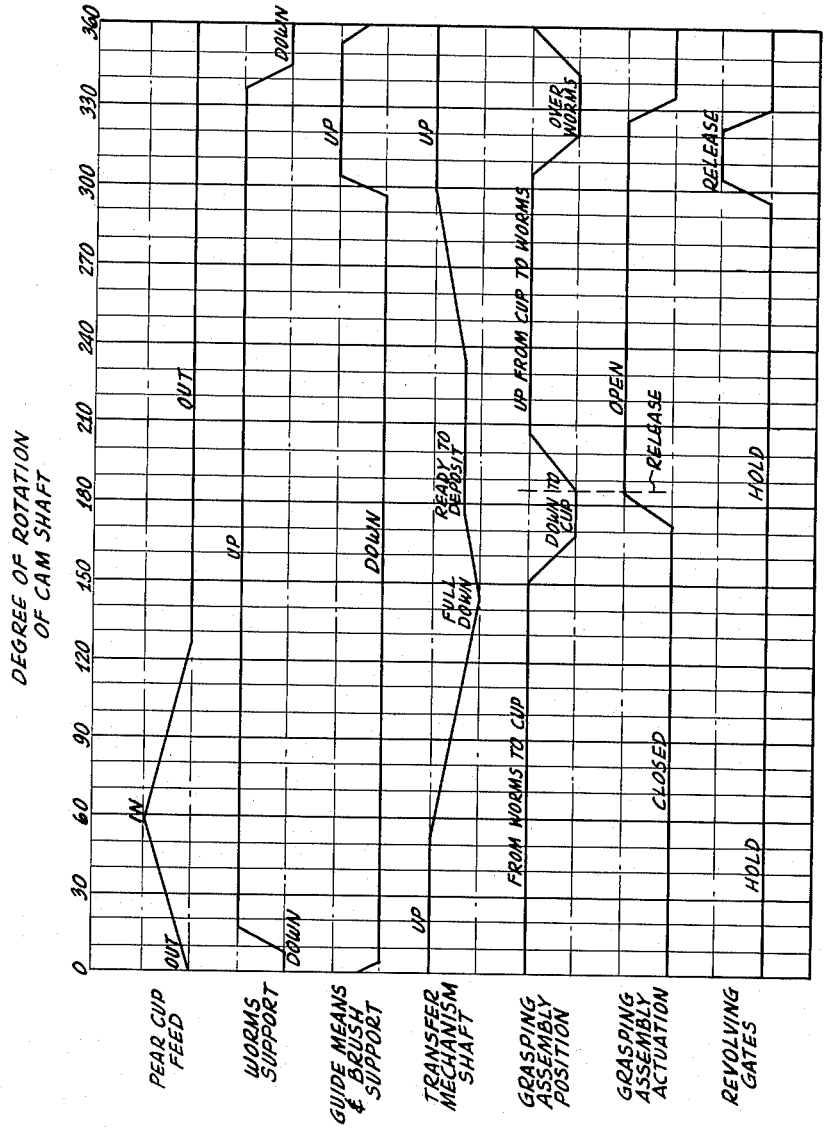
FIGURE 31 is a diagram showing the sequence of operation of the various parts during one complete cycle of operation. The relation of the cam shaft to the several showings in FIGURES 10–18 is given in the following table.

The coordination of and the relationship between these operations may be readily understood from an examination of the timing chart shown in FIGURE 31 which illustrates one complete cycle of rotation. The cycle "Pear Cup Feed" is that of the cup 15 which is a portion of the pear preparation disclosed in the previously mentioned patent and patent applications. Between 125° and 360° of rotation of the cam shaft, the cup is in an upright position as in FIGURES 15 through 18.

Alternative Orienting Means

In the machine described heretofore the orientation of a pear has been effected by the worms 81 and 82. Essentially these provide supporting surfaces which cooperate to support a pear, the surfaces having an outer configuration which is substantially the inverse of the outer configuration of a pear resting on the members with its major axis parallel to the longitudinal axis of the members. In its simplest form, as appears in the blank in FIGURE 4, each of the members includes a truncated cone 403 having its small end joined by a cylindrical portion 404 to the small end of a second truncated cone 406.

When a pear is dropped at random onto these members while they are rotating in the same direction the pear can be positioned in various ways. Generally, the rotation of the two members having an outer surface configuration as described is effective to turn the pear into a position wherein continued rotation of the orienting members brings it to rest in a position where the major axis of the pear is parallel to the axis of the orienting members and preferably where its stem ends points away from the bar 84. In the structure described heretofore the orienting members 81 and 82 have each been provided with a screw thread to turn a pear which has its stem end projecting downwardly between the rotating orienting members; the screw thread engages the stem or stem end and conveys it towards the free end of the worms so that the axis of the pear is parallel to the axes of the worms with its stem end at the free end of the worms.

While the screw thread is quite effective in turning a pear supported on the orienting members, other means can be provided for imparting the necessary turning motion. Thus, referring particularly to FIGURE 32, I provide orienting members 401 and 402 which basically correspond to the blank structure 101 of FIGURE 4 wherein a first truncated cone 403 has its small end joined by a cylindrical portion 404 to the small end of a second truncated cone 406. When such members are arranged in pairs as shown the two have an outer surface configuration for the support of a pear which corresponds substantially to the inverse of the configuration of a supported pear as has been described. The members can be smooth or roughened as by knurling.

To direct a pear into position for orientation, a box-like structure provided by plates 451 and 452 is provided on the guide structure 52 and depends therefrom adjacent the orienting members as appears in FIGURE 37. Plate 451 has a tongue 453 fitting closely adjacent one side of orienting member 402 while plate 452 has a depending tongue 454 fitting between the two orienting members as appears in FIGURE 32. It is possible for a pear to fall in any one of many positions and in FIGURES 33–36 I have shown some of these. Thus a pear may come to rest with its stem end against the wall 451 as in FIGURE 33 or against the wall 452 as in FIGURE 34. In either case, the rotating rolls are effective to turn the pear quickly into the position shown in FIGURE 35 wherein its butt end is resting on orienting member 402 and the stem end projects across transversely in the longitudinal axis of the other orienting member 401. To turn the pear from this position into the desired position of orientation as shown in FIGURE 36, I provide a saucer-like support 422. Periodically the saucer 422 is lifted from a lower position (FIGURE 37) in which it is free of engagement with a pear to an upper position in which it engages the underside of the bulb-like portion of the pear and rotates the pear counterclockwise and into a position in which the pear is aligned with the rolls and extends away from cross-bar 84 as appears in FIGURE 36. The pear finally comes to rest against the stop 441.

Each member 401 and 402 is secured on one end of a spindle 83 which is supported in suitable bearings in the crossbar 84; each spindle has a sprocket at its outer end over which chain 89 is trained as is shown in FIGURE 20. The cross-bar 84 includes a bar 407 secured thereto by bolts 408. At one end bar 407 is provided with a boss 409 to support shaft 411. At its opposite end the bar 407 includes a bearing 412 supporting a shaft 413, the latter having a bevel gear 414 secured thereto at one end and enmeshed with a bevel gear 416 on an end of spindle 83. At its other end shaft 413 has a pulley 417 secured by nut 418, a belt 421 being trained about the pulleys 417 and 419. At its upper end, shaft 411 carries the saucer-like plate 422 fitting between the members 401 and 402 and movable vertically as will be described.

Means are provided for moving the saucer-like cup from the position in which it appears in FIGURE 37 and wherein it is out of contact with a pear supported on the members 401 and 402 to an elevated position in which the saucer will engage the underside of a pear. Supported upon shaft 182 are a plurality of forwardly extending fingers 431, the end of each finger extending beneath the end of a shaft 411 so that, upon rocking of the shaft 182 in a counterclockwise direction in FIGURE 37, each finger is moved counterclockwise to engage the end of shaft 411 and raise the shaft and the saucer thereon into a position in which the saucer engages a pear. Shaft 182 has an offset lever crank 432 attached at one end. A link 433 extends from the offset lever crank 432 and is connected to one end of a lever 434 pivotally supported intermediate its ends at 436. At its other end, lever 434 carries a roller 437 which is engaged with cam 225, spring 440 holding the roller against the cam. The latter has a lobe protuberance 256 thereon which serves to rock the lever 434.

In operation, a pear is deposited on the members 401 and 402 as has been described in connection with members 81 and 82. The pear will readily assume one of the positions of FIGURES 33–36. If the pear is aligned with its major axis transverse to the axis of the members 401 and 402, then it must be turned through 90°. To effect this, the finger 431 is rocked as has been previously described and the constantly rotating saucer 422 is elevated to engage the pear. Because the saucer is constantly turning in a counterclockwise direction, the pear is turned into the desired position of alignment, that is, with its stem end pointing away from the bar 84, the pear then coming to rest with its neck or stem against the wire stop 441 which depends from the guide structure 52. The saucer is raised in any case but if the pear is correctly aligned, the wire stop prevents the pear from rotating further because the stem end of the pear comes into engagement with the wire stop. The turning movement imparted by the saucer is equivalent to that provided by the threads formed upon the members 81 and 82 and the curved wires 66 and 67 shown in FIGURE 20.

This application is a continuation-in-part of application Serial No. 80,156 filed January 3, 1961.

I claim:

1. A device for turning a pear into a predetermined position of alignment comprising a pair of worms, each worm having a continuous thread varying in diameter along the longitudinal axis of the worm to provide a pear supporting surface approximating the inverse of the configuration of a pear supported on the worms with the major axis of the pear parallel to the major axis of the worms, means supporting the worms for rotation about spaced parallel axes extending in a horizontal plane wtih the worms closely adjacent one another to provide cooperative support for a pear placed on the worms, and means for rotating the worms in the same direction.

2. A device for turning a pear into a predetermined position of alignment comprising a first and a second worm, each worm having a cylindrical thread connected to a tapered thread, means supporting the worms for rotation about spaced parallel axes extending in a horizontal plane with the worms closely adjacent one another to provide cooperative support for a pear placed on the worms, means for rotating the worms in the same direction to turn a pear supported thereon, and an arcuately-shaped wire disposed above the plane of the worms and one one side of the first worm to engage a stem on a pear and direct the stem end of the pear toward one end of the worms.

3. A device for turning a pear into a predetermined position of alignment comprising a first and a second worm, each worm having a continuous thread varying in diameter along the longitudinal axis of the worm to provide a pear supporting surface approximating the inverse of the configuration of a pear supported on the worms with the major axis of the pear parallel to the major axis of the worms, means supporting the worms for rotation about spaced parallel axes extending in a horizontal plane with the worms closely adjacent one another to provide cooperative support for a pear placed on the worms, means for rotating the worms in the same direction to turn a pear supported thereon, and an arcuately-shaped wire disposed above the plane of the worms and on one side of the first worm to engage a stem on a pear and direct the stem end of the pear toward one end of the worms.

4. A device for turning a pear into a predetermined position of alignment comprising a first and a second worm, means supporting the worms for rotation about spaced parallel axes extending in a horizontal plane with the worms closely adjacent one another to provide cooperative support for a pear placed on the worms, each worm having a straight cylindrical screw thread and a tapered screw thread formed as a continuation of the cylindrical screw thread, means for rotating the worms in the same direction to turn a pear supported thereon, and an arcuately-shaped wire disposed above the plane of the worms and on one side of the first worm to engage a stem on a pear and direct the stem end of the pear toward one end of the worms.

5. A device for turning a pear into a predetermined position of alignment comprising a first and a second worm, each worm having a cylindrical thread connected to a tapered thread, means supporting the worms for rotation about spaced parallel axes extending in a horizontal plane with the worms closely adjacent one another to provide cooperative support for a pear placed on the worms, means for rotating the worms in the same direction to turn a pear supported thereon, and a brush rotatable about an axis parallel to that of the worms and disposed above the plane containing the axes of the worms and on one side of the second worm to engage a stem on a pear and direct the stem end of the pear toward one end of the worms.

6. A device for turning a pear into a predetermined position of alignment comprising a first and a second worm, each worm having a continuous thread varying in diameter along the longitudinal axis of the worm to provide a pear supporting surface approximating the inverse of the configuration of a pear supported on the worms with the major axis of the pear parallel to the major axis of the worms, means supporting the worms for rotation about spaced parallel axes extending in a horizontal plane with the worms closely adjacent one another to provide cooperative support for a pear placed on the worms, means for rotating the worms in the same direction to turn a pear supported thereon, and a brush rotatable about an axis parallel to that of the worms and disposed above the plane containing the axes of the worm and on one side of the second worm to engage a stem on a pear and direct the stem end of the pear toward one end of the worms.

7. A device for turning a pear into a predetermined position of alignment comprising a first and a second worm, means supporting the worms for rotation about spaced parallel axes extending in a horizontal plane with the worms closely adjacent one another to provide cooperative support for a pear placed on the worms, each worm having a straight cylindrical screw thread and a tapered screw thread formed as a continuation of the cylindrical screw thread, means for rotating the worms in the same direction to turn a pear supported thereon, and a brush rotatable about an axis parallel to that of the worms and disposed above the plane containing the axes of the worms and on one sdie of the second worm to engage a stem on a pear and direct the stem end of the pear toward one end of the worms.

8. A device for turning a pear into a predetermined position of alignment comprising a first and a second worm, each worm having a cylindrical thread connected to a tapered thread, means supporting the worms for rotation about spaced parallel axes extending in a horizontal plane with the worms closely adjacent one another to provide cooperative support for a pear placed on the worms, means for rotating the worms in the same direction to turn a pear supported thereon, an arcuately-shaped wire disposed above the plane of the worms and one one side of the first worm to engage a stem on a pear and direct the stem end of the pear toward one end of the worms, and a brush rotatable about an axis parallel to that of the worms and disposed above the plane containing the axes of the worms and on one side of the second worm to engage a stem on a pear and direct the stem end of the pear toward one end of the worms.

9. A device for turning a pear into a predetermined position of alignment comprising a first and a second worm, each worm having a continuous thread varying in diameter along the longitudinal axis of the worm to provide a pear supporting surface approximating the inverse of the configuration of a pear supported on the worms with the major axis of the pear parallel to the major axis of the worms, means supporting the worms for rotation about spaced parallel axes extending in a horizontal plane with the worms closely adjacent one another to provide cooperative support for a pear placed on the worms, means for rotating the worms in the same direction to turn a pear supported thereon, an arcuately-shaped wire disposed above the plane of the worms and on one side of the first worm to engage a stem on a pear and direct the stem end of the pear toward one end of the worms, and a brush rotatable about an axis parallel to that of the worms and disposed above the plane containing the axes of the worms and one one side of the second worm to engage a stem on a pear and direct the stem end of the pear toward one end of the worms.

10. A device for turning a pear into a predetermined position of alignment comprising a first and second worm, means supporting the worms for rotation about spaced parallel axes extending in a horizontal plane with the worms closely adjacent one another to provide cooperative support for a pear placed on the worms, each worm having a straight cylindrical screw thread and a tapered screw thread formed as a continuation of the cylindrical screw thread, means for rotating the worms in the same direction to turn a pear supported thereon, an arcuately-shaped wire disposed above the plane of the worms and on one side of the first worm to engage a stem on a pear and direct the stem end of the pear toward one end of the worms, and a brush rotatable about an axis parallel to that of the worms and disposed above the plane containing the axes of the worms and on one side of the second worm to engage a stem on a pear and direct the stem end of the pear toward one end of the worms.

11. A device for turning a pair into a predetermined position of alignment comprising a pair of worms, each worm having its outer surface asymmetrically disposed about its longitudinal axis, said outer surface being the inverse of the configuration of the outer surface of a pear resting on the worms and having its major axis parallel to the longitudinal axis of the worms, each worm having a continuous screw thread in said outer surface, and means supporting the worms for rotation about parallel spaced axes extending in a common plane.

12. A device for turning a pear into a predetermined position of alignment comprising a pair of worms, each worm having its outer surface asymmetrically disposed about its longitudinal axis, said outer surface being the inverse of the configuration of the outer surface of a pear resting on the worms with its major axis parallel to the longitudinal axis of the worms, each worm having a continuous screw thread in said outer surface, means supporting the worms for rotation about spaced parallel axes extending in a common plane, and means on each side of the worms for engaging a stem on a pear and for turning the pear whereby the pear is aligned with the worms.

13. A device for turning a pear into a predetermined position comprising a pair of worms, means supporting said worms in a parallel spaced horizontal relationship to support a pear, means for rotating the worms in the same direction to turn a pear into a position in which the major axis of the pear is horizontal, transfer means for engaging a pear supported on the worms and for moving the pear to another position, and means for moving the worm support means to move the worms from a horizontal position to a position in which the worms extend below the horizontal after the transfer means engages the pear.

14. A device for turning a pear into a predetermined position comprising a pair of worms, means supporting said worms in a parallel spaced horizontal relationship to support a pear, means for rotating the worms in the same direction to turn a pear into a position in which its major axis is horizontal, transfer means for engaging a pear supported on the worms and for moving the pear to another position in which the major axis of the pear is vertical, and means for moving the worm support means to permit the transfer means to move a pear supported thereby.

15. A device for turning a pear into a predetermined position comprising a pair of worms, each worm having a helix of varying diameter fitting the pear surface, means supporting said worms in a parallel spaced relationship to support a pear, means for rotating the worms in the same direction to turn a pear into a position in which its major axis is parallel to that of the worms, and transfer means for engaging a pear supported on the worms and for moving the pear to another position.

16. A device for turning a pear into a predetermined position comprising a pair of helical worms providing a pear support fitting the surface of a pear, means supporting said worms in a parallel spaced relationship to support a pear, means for rotating the worms in the same direction to turn a pear into a position in which its major axis is parallel to that of the worms, transfer means for engaging a pear supported on the worms and for moving the pear to another position in which the major axis of the pear is vertical, and means for moving the worm support means to permit the transfer means to engage and move a pear.

17. A device for turning a pear into a predetermined position comprising a pair of worms, each worm having a straight cylindrical screw thread and a tapered screw thread formed as a continuation of the cylindrical screw thread, means supporting said worms from one end in a parallel spaced horizontal relationship to support a pear, means for rotating the worms in the same direction to turn a pear into a first position in which its major axis is horizontal, transfer means for engaging a pear supported on the worms and for moving the pear into a second position in which the major axis of the pear is vertical, and means for moving the worm support means to move the worms from a horizontal position to a position in which the worms extend below the horizontal position to permit the transfer means to move a pear supported by the transfer means from the first to the second position.

18. A device for turning a pear into a predetermined position comprising a pair of worms, means supporting said worms in a parallel spaced horizontal relationship to support a pear, means for rotating the worms in the same direction to turn a pear into a first position in which the major axis of the pear is horizontal, transfer means for engaging a pear supported on the worms and for moving the pear into a second position in which the major axis of the pear is vertical, means for moving the worm support means to move the worms from a first position in which the worms are horizontal to a second position in which the worms extend below the horizontal following engagement of the transfer means with a pear supported by the worms, pear guide means mounted over the worms to direct a pear to the worms, a chute for delivering a single pear from a mass thereof, a forwarding chute for moving a pear from the delivery chute into the guide means, said forwarding chute and guide means being movable back and forth over a path between the delivery chute and said worms to transfer a pear from the delivery chute to the worms, a gate movable in the forwarding chute to retain a pear therein until the guide means is adjacent the worms, and means coordinating the movement of the forwarding chute and guide means back and forth over said path with the movement of said worm support means between said first and second positions.

19. A device for turning a pear into a predetermined position comprising a pair of worms, means supporting said worms in a parallel spaced horizontal relationship to support a pear, means for rotating the worms in the same direction to turn a pear into a first position in which the major axis of the pear is horizontal, transfer means for engaging a pear supported on the worms and for moving the pear into a second position for transfer to a pear processing support, means for moving the worm support means to move the worms from a first position in which the worms are horizontal to a second position following engagement of the transfer means with a pear supported by the worms, pear guide means mounted over the worm to direct a pear to the worms, a chute for delivering a single pear from a mass thereof, a forwarding chute for moving a pear from the delivery chute into the guide means, said forwarding chute and guide means being movable back and forth over a path between the delivery chute and said worms to transfer a pear from the delivery chute to the worms, a gate movable in the forwarding chute to retain a pear therein until the guide means is adjacent the worms, and means coordinating the movement of the forwarding chute and guide means back and forth over said path with the movement of said worm support means between said first and second positions.

20. A device for turning a pear into a predetermined position comprising a pair of worms, means supporting said worms in a parallel spaced relationship to support a pear, means for rotating the worms in the same direction to turn a pear into a position in which its major axis is horizontal, transfer means for engaging a pear supported on the worms and for moving the pear into a position in which the major axis of the pear is vertical, means for moving the worm support means to move the worms from a first position in which the worms are horizontal to a second position following engagement of the transfer means with a pear supported by the worms, pear guide means mounted over the worms to direct a pear to the worms, a delivery chute for delivering a single pear from a mass thereof, a forwarding chute for moving a pear from the delivery chute into the guide means, said forwarding chute and guide means being movable back and forth over a path between the delivery chute and said worms, a gate movable into the forwarding chute to retain a pear therein until the guide means is adjacent the worms, and means for moving the forwarding chute and guide means back and forth over said path during movement of said worm support means between said first and said second positions whereby the forwarding chute receives a pear when the worms are in said second position and delivers the pear to the worms when the worms are in the first position.

21. A device for turning a pear into a predetermined position comprising a pair of worms, means supporting said worms in a parallel spaced relationship to support a pear, guide means mounted over the worms to direct a pear to the worms, a delivery chute for delivering a single pear from a mass thereof, a forwarding chute for moving a pear from the delivery chute through said guide means to said worms, the forwarding chute and guide means being movable back and forth over a path between the delivery chute and the worms to move a pear from the delivery chute to the worms, means for rotating the worms in the same direction to turn a pear into a position in which its major axis is horizontal, and transfer means for engaging a pear supported on the worms and for moving the pear into a second position.

22. A device for turning a pear into a predetermined position comprising a pair of worms, means supporting said worms in a parallel spaced relationship to support a pear, pear guide means mounted over the worms to direct a pear to the worms, a delivery chute for delivering a single pear from a mass thereof, a forwarding chute for moving a pear from the delivery chute through said guide means to said worms, said forwarding chute and guide means being movable back and forth over a path between the delivery chute and the worms to transfer a pear from the delivery chute to the worms, a gate movable into the forwarding chute to retain a pear therein until the guide means is adjacent the worms, means for rotating the worms in the same direction to turn a pear into a position in which its major axis is horizontal, and transfer means for engaging a pear supported on the worms and for moving the pear into a second position.

23. A device for turning a pear into a predetermined position comprising a pair of worms, means supporting said worms in a parallel spaced relationship to support a pear, pear guide means mounted over the worms to direct a pear to the worms, a delivery chute for delivering a single pear from a mass thereof, a forwarding chute for moving a pear from the delivery chute through said guide means, means for rotating the worms in the same direction to turn a pear into a position in which its major axis is horizontal, transfer means for engaging a pear supported on the worms and for moving the pear into a second position, and means for moving the worm support means to move the worms from a horizontal position to a position in which the worms extend below the horizontal.

24. A device for turning a pear into a predetermined position comprising a pair of worms, means supporting said worms from one end in a parallel spaced relationship to support a pear, pear guide means mounted over the worms to direct a pear to the worms, a delivery chute for delivering a single pear from a mass thereof, a forwarding chute for moving a pear from the delivery chute to said guide means, the forwarding chute and guide means being movable back and forth over the path between the delivery chute and the worms to transfer a pear from the delivery chute through the guide means to the worms, means for rotating the worms in the same direction to turn a pear into a position in which its major axis is horizontal, transfer means for engaging a pear supported on the worms and for moving the pear into a position in which the longitudinal axis of the pear is vertical, and means for moving the worm support means to move the worms from a horizontal position to a position in which the worms extend below the horizontal.

25. A device for turning a pear into a predetermined position comprising a pair of worms, means supporting said worms from one end in a parallel spaced relationship to support a pear, pear guide means mounted over the worms to direct a pear to the worms, a delivery chute for delivering a single pear from a mass thereof, a forwarding chute for moving a pear from the delivery chute to the worms, the forwarding chute and guide means being movable back and forth over a path between the delivery chute and the worms to transfer a pear from the delivery chute to the worms, a gate movable into the forwarding chute to retain a pear therein until the guide means is adjacent the worms, means for rotating the worms in the same direction to turn a pear into a position in which its major axis is horizontal, transfer means for engaging a pear supported on the worms and for moving the pear into a position in which the longitudinal axis of the pear is vertical, and means for moving the worm support means to move the worms from a horizontal position to a position in which the worms extend below the horizontal.

26. A device for turning a pear into a predetermined position comprising a pair of worms, means supporting said worms in a parallel spaced relationship to support a pear, pear guide means mounted over the worms to direct a pear to the worms, delivery means for delivering a single pear from a mass thereof including a belt movable over a generally horizontal path, a guide plate extending along one side of the belt and having a plurality of spaced openings therein to permit an article on the belt to pass through the guide plate, a multi-bladed gate provided in each opening and rotatable therein to move articles one-by-one into a delivery chute, a forwarding chute for moving a pear from the delivery chute through said guide means to said worms, said forwarding chute and guide means being movable back and forth over a path between the delivery chute and the worms to transfer a pear from the delivery chute to the worms, a gate movable into the forwarding chute to retain a pear therein until the guide means is adjacent the worms, means for rotating the worms in the same direction to turn a pear into a position in which its major axis is horizontal, and transfer means for engaging a pear supported on the worms and for moving the pear into a position in which the major axis of the pear is vertical.

27. A device for turning a pear into a predetermined position comprising a pair of worms, means supporting said worms in a parallel spaced relationship to support a pear, a pear guide means mounted over the worms to direct a pear to the worms, delivery means for delivering a single pear from a mass thereof, including a belt movable over a generally horizontal path, a guide plate extending along one side of the belt and having a plurality of spaced openings therein to permit an article on the belt to pass through the guide plate, a multi-bladed gate provided in each opening and rotatable therein to move articles one-by-one into a delivery chute, a forwarding chute for moving a pear from the delivery chute through said guide means, means for rotating the worms in the same direction to turn a pear into a position in which its major axis is horizontal, transfer means for engaging a pear supported on the worms and for moving the pear into a position in which the major axis of the pear is vertical, and means for moving the worm support means to move the worms from a horizontal position to a position in which the worms extend below the horizontal.

28. A device for turning a pear into a predetermined position of alignment comprising a pair of pear orienting and support members, means supporting said members for rotation with said members disposed in a parallel closely spaced relationship for supporting a pear, means for rotating said members simultaneously and in the same direction to rotate a pear supported on the members, each member being asymmetrical about its longitudinal axis and having an outer surface configuration substantially the inverse of the outer surface configuration of a pear resting on the members with its major axis parallel to the longitudinal axis of the members, and means adjacent the outside of each member and superimposed above the plane of the members for turning the stem end of a pear into engagement with the members.

29. A device for turning a pear into a predetermined position of alignment comprising a pair of pear orienting and support members, means supporting said members for rotation with said members disposed in a parallel closely spaced relationship for supporting a pear, and means for rotating said members simultaneously and in the same direction to rotate a pear supported on the members, each member being asymmetrical about its longitudinal axis and having a continuous screw-thread cut in its outer surface, said outer surface configuration being substantially the inverse of the outer configuration of a pear resting on the members with its major axis parallel to the longitudinal axis of the members.

30. A device for turning a pear into a predetermined position of alignment comprising a pair of worms, each providing a pear supporting surface, each worm having a longitudinal axis, means supporting the worms for rotation about spaced parallel axes extending in a common plane with the worms closely adjacent to one another to support a pear placed thereon and therebetween; the pear supporting surface on each worm comprising a first cylindrical portion, a second cylindrical portion, the first and second cylindrical portions being of different diameters and being connected by a third tapered portion, the three portions having a thread therein of substantially uniform depth, and a fourth portion flaring outwardly along the axis of the worm and away from the second cylindrical portion; and means for rotating the worms.

31. A device for turning a pear into a predetermined position of alignment comprising a pair of worms, each providing a pear supporting surface, each worm having a longitudinal axis, means supporting the worms for rotation about spaced parallel axes extending in a common plane with the worms closely adjacent to one another to support a pear placed thereon and therebetween; the pear supporting surface on each worm comprising a first cylindrical portion, a second cylindrical portion, the second cylindrical portion being of a smaller diameter than the first portion, the first and second portions being connected by a third tapered portion, the three portions on at least one of the worms having a helical thread therein, and a fourth portion flaring outwardly along the axis of the worm and away from the second portion; and means for rotating the worms.

32. A device for turning a pear into a predetermined position of alignment comprising a pair of worms, each providing a pear supporting surface, each worm having a longitudinal axis; means supporting the worms from one end for rotation about spaced parallel axes extending in a common plane with the worms closely adjacent to one another to support a pear placed thereon and therebetween; the pear supporting surface on each worm comprising a first cylindrical portion adjacent the supported end of said worm and a second cylindrical portion at the other end of the worm, the second portion being of a larger diameter than the first portion, the first and second portions being connected by a third tapered portion, the three portions on at least one of the worms having thread therein of substantially uniform depth, and a fourth portion flaring outwardly away from the first portion along the axis of the worm; and means for rotating the worms.

33. A device for turning a pear into a predetermined position of alignment comprising a pair of worms, each providing a pear supporting surface, each worm having a longitudinal axis; means supporting the worms from one end for rotation about spaced parallel axes extending in a common plane with the worms closely adjacent to one another to support a pear placed thereon and therebetween; the pear supporting surface on each worm comprising a first cylindrical portion adjacent the supported end of said worm and a second cylindrical portion at the other end of the worm, the second portion being of a larger diameter than the first portion, the first and second portions being connected by a third tapered portion, the three portions on each worm having a helical thread therein, and a fourth portion flaring away from one end of the first portion along the axis of the worm; and means for rotating the worms.

34. In a device for turning a pear into predetermined position of alignment, a worm having a longitudinal axis, a first cylindrical portion and a second cylindrical portion, the first and the second portions being asymmetrically disposed about said axis, said first and second portions being of different diameters and being connected by a third tapered portion, the three portions having a thread therein of a substantially uniform depth, and a fourth portion flaring outwardly away from the second portion.

35. In a device for turning a pear into a predetermined position of alignment, a worm having a longitudinal axis and a first cylindrical portion and a second cylindrical portion, the first and the second portions being asymmetrically disposed about said axis, said second portion being of a smaller diameter than the first portion, the first and second portions being connected by a third tapered portion, the three portions having a thread therein of a substantially uniform depth, and a fourth portion flaring outwardly away from one end of the second portion.

36. In a device for turning a pear into a predetermined position of alignment, a pair of worms, means supporting the worms from one end thereof with their longitudinal axes extending in a parallel spaced relationship in a common plane to provide cooperative support for a pear, means for depositing a pear at random between the worms, means for rotating the worms to turn a pear supported on the worms into a position in which the major axis of the pear extends substantially parallel to the axes of the worms, each worm having a configuration such that the two worms in their side-by-side relationship provide mutually cooperating pear supporting surfaces approximating the inverse of the configuration of a pear supported on the worms with the major axis of the pear parallel to the major axes of the worms, each worm having a thread about its outer surface of a width and depth sufficient to receive the stem end of a pear supported between the worms to turn the pear into a position wherein the major axis of the pear is parallel to the major axes of the worms.

37. In a device for turning a pear into a predetermined position of alignment, a pair of worms, means supporting the worms from one end thereof with their longitudinal axes extending in a parallel spaced relationship in a common plane to provide cooperative support for a pear, means for depositing a pear at random between the worms, means for rotating the worms to turn a pear supported on the worms into a position in which the major axis of the pear extends substantially parallel to the axes of the worms, each worm having a configuration such that the two worms in their side-by-side relationship provide mutually cooperating pear supporting surfaces approximating the inverse of the configuration of a pear supported on the worms with the major axis of the pear parallel to the major axes of the worms; at least one of the worms having a thread about its outer surface of a width and depth sufficient to receive the stem end of a pear supported between the worms to turn the pear into a position wherein the major axis of the pear is parallel to the major axes of the worms.

38. A device for turning a pear into a predetermined position of alignment comprising a pair of pear orienting and supporting members, means supporting said members for rotation in a horizontal plane with said members disposed in a parallel closely spaced relationship for supporting a pear, means for rotating said members simultaneously and in the same direction to rotate a pear supported on the members, the outer surface configuration of each member being substantially asymmetrical about the longitudinal axis of the member and the cooperating surfaces of said members being substantially the inverse of the outer surface configuration of a pear resting on the members with its major axis parallel to the longitudinal axis of the members, and means adjacent an end of at least one of said members and superimposed above the plane of the members for engaging the stem end of a pear to stop the pear in a predetermined position of alignment wherein the stem end of the pear is adjacent an end of the members.

39. In a device for orienting a pear, a pair of substantially like pear orienting and supporting members, means supporting said members for rotation with said members disposed in a parallel closely spaced relationship for supporting a pear, and means for rotating said members simultaneously and in the same direction to rotate a pear supported on the members, each pear orienting member having an outer surface substantially symmetrical about its longitudinal axis and provided by a pair of truncated cones each having a base end and a small end, the small end of one cone being connected to the small end of the other cone by an intermediate cylindrical portion, the outer surface of each member having a screw thread formed therein and rendering said member asymmetrical about its longitudinal axis.

40. A device for turning a pear to a predetermined position comprising a pair of pear orienting and support members, each member having an outer surface configuration which is substantially the inverse of the outer surface configuration of a pear resting on the support members with its major axis parallel to the longitudinal axis of the support members; means supporting said members in a parallel spaced relationship to support a pear; means for rotating the members in the same direction to turn a positioned pear placed thereon in random position into a position in which the major axis of the pear is aligned with the major axis of said support members; transfer means for engaging a pear supported on the support members and for moving an engaged pear to another position; and means for moving said supporting means for said support members to move the support members from a first generally horizontal position to a second position in which the support members are below the horizontal to facilitate movement of a pear by said transfer means.

41. A device for turning a pear to a predetermined position comprising a pair of pear orienting and support members, each member having an outer surface configuration which is substantially the inverse of the outer surface configuration of a pear resting on the support members with its major axis parallel to the longitudinal axis of the support members; means supporting said members in a parallel spaced relationship to support a pear; means for rotating the members in the same direction to turn a pear placed thereon in random position into a position in which the major axis of the pear is aligned with the major axis of said support members; and transfer means for engaging an aligned pear supported on the support members and for moving an engaged pear to another position.

References Cited in the file of this patent
UNITED STATES PATENTS

| | | |
|---|---|---|
| 626,284 | Lyons | June 6, 1899 |
| 2,961,087 | Reading | Nov. 22, 1960 |
| 3,040,868 | Waters | June 26, 1962 |